(12) United States Patent
Chien et al.

(10) Patent No.: US 9,532,058 B2
(45) Date of Patent: Dec. 27, 2016

(54) INTRA PREDICTION MODE CODING WITH DIRECTIONAL PARTITIONS

(75) Inventors: Wei-Jung Chien, San Diego, CA (US); Yunfei Zheng, Cupertino, CA (US); Marta Karczewicz, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 899 days.

(21) Appl. No.: 13/485,522

(22) Filed: May 31, 2012

(65) Prior Publication Data

US 2012/0307894 A1 Dec. 6, 2012

Related U.S. Application Data

(60) Provisional application No. 61/493,331, filed on Jun. 3, 2011, provisional application No. 61/554,334, filed on Nov. 1, 2011, provisional application No. 61/586,597, filed on Jan. 13, 2012.

(51) Int. Cl.
| | |
|---|---|
| H04N 7/32 | (2006.01) |
| H04N 19/11 | (2014.01) |
| H04N 19/176 | (2014.01) |
| H04N 19/46 | (2014.01) |
| H04N 19/593 | (2014.01) |

(52) U.S. Cl.
CPC ............ *H04N 19/11* (2014.11); *H04N 19/176* (2014.11); *H04N 19/46* (2014.11); *H04N 19/593* (2014.11)

(58) Field of Classification Search
CPC .................... H04N 19/00278; H04N 19/00763
USPC ..................................................... 375/240.12
See application file for complete search history.

(56) References Cited

U.S. PATENT DOCUMENTS

| | | | |
|---|---|---|---|
| 2007/0036215 A1* | 2/2007 | Pan ...................... | H04N 19/176 375/240.12 |
| 2008/0175317 A1 | 7/2008 | Han et al. | |
| 2009/0232215 A1 | 9/2009 | Park et al. | |
| 2009/0296816 A1 | 12/2009 | Drezner et al. | |
| 2010/0322315 A1 | 12/2010 | Hasuo | |

FOREIGN PATENT DOCUMENTS

| | | |
|---|---|---|
| CN | 101394565 A | 3/2009 |
| WO | WO2008117158 A1 | 10/2008 |

OTHER PUBLICATIONS

Lee et al. "Intra-Mixture Prediction Mode and Enhanced Most Probable Mode Estimation for Intra Coding in H.264/AVC," 2009 Fifth International Joint Conference on INC, IMS, and IDC, IEEE, Piscataway, NJ, USA, Aug. 25, 2009 (Aug. 25, 2009), pp. 1619-1622, XP031564943, ISBN: 978-0-7695-3769-6.*

(Continued)

*Primary Examiner* — Andy Rao
*Assistant Examiner* — Tyler Edwards
(74) *Attorney, Agent, or Firm* — Shumaker & Sieffert, P.A.

(57) ABSTRACT

A video coder can determine a most probable mode for a block of video data using non-square partitions based on the direction of the non-square partitions. When the direction of the non-square partitions is vertical, an intra prediction mode of a left-neighboring block can be selected as the most probable intra prediction mode, and when the direction of the non-square partitions is horizontal, an intra prediction mode of an above-neighboring block can be selected as the most probable intra prediction mode.

70 Claims, 10 Drawing Sheets

(56) References Cited

OTHER PUBLICATIONS

Wang et al. "A Novel Fast Algorithm for Intra Mode Decision in H.264/AVC Encoders," 2006 IEEE International Symposium on Circuits and Systems, Piscataway, NJ, USA, May 21, 2006 (May 21, 2006), pp. 3498-3501, XP010939305, ISBN: 978-07803-9389-9.*

Cao et al. "CE6.b1 Report on Short Distance Intra Prediction Method," JCT-VC Proposal, Mar. 10, 2011 (Mar. 10, 2011), XP030008784, ISSN: 0000-0007.*

Lim et al. "Description of video coding technology proposal by SK telecom, Sejong University and Sungkyunkwan University," JCT-VC Meeting, XP030007550, Apr. 13, 2010 (Apr. 13, 2010), XP030007551, ISSN: 0000-0049.*

Lee et al. "Intra-Mixture Prediction Mode and Enhanced Most Probable Mode Estimation for Intra Coding in H.264/AVC," 2009 Fifth International Joint Conference on INC, IMS, and IDC, IEEE, Piscataway, N J, USA, Aug. 25, 2009 (Aug. 25, 2009), pp. 1619-1622, XP031564943, ISBN: 978-0-7695-3769-6.*

Wang et al. "A Novel Fast Algorithm for Intra Mode Decision in H.264/AVC Encoders," 2006 IEEE International Symposium on Circuits and Systems, Piscataway, N J, USA, May 21, 2006 (May 21, 2006), pp. 3498-3501, XP010939305, ISBN: 978-0-7803-9389-9.*

Cao et al. "CE6.b1 Report on Short Distance Intra Prediction Method," JCT-VC Proposal, Mar. 10, 2011 (Mar. 10, 2011), XP030008784, ISSN: 0000-0007.*

Lim et al. "Description of video coding technology proposal by SK telecom, Sejong University and Sungkyunkwan University," JCT-VC Meeting, ISSN: 0000-0049.*

Lee et al. "Intra-Mixture Prediction Mode and Enhanced Most Probable Mode Estimation for Intra Coding in H.264/AVC," 2009 Fifth International Joint Conference on INC, IMS, and IDC, IEEE, ISBN: 978-0-7695-3769-6.*

Cao et al., "CE6.b1 Report on Short Distance Intra Prediction Method," JCTVC-E278, Joint Collaborative Team on Video Coding, Mar. 16-23, 2011, 7 pp.

International Search Report and Written Opinion—PCT/US2012/040510—ISA/EPO—Jul. 6, 2012—18 pp.

Karczewicz et al., "Improvements on VLC", JCTVC-C263, Joint Collaborative Team on Video Coding, Oct. 7-15, 2010, 5 pp.

Lee et al., "Intra-Mixture Prediction Mode and Enhanced Most Probable Mode Estimation for Intra Coding in H.264/AVC," 2009 Fifth International Joint Conference on INC, IMS, and IDC, IEEE, Aug. 25, 2009, 4 pp.

Pan et al., "Fast Mode Decision Algorithm for Intraprediction in H.264/AVC Video Coding", IEEE Transactions on Circuits and Systems for Video Technology, IEEE, vol. 15, No. 7, Jul. 1, 2005, 10 pp.

Lim et al., "Description of video coding technology proposal by SK telecom, Sejong Univ. and Sungkyunkwan Univ.", JCTVC-A113, Joint Collaborative Team on Video Coding, Apr. 15-23, 2010, 41 pp.

Sarwer et al., "Improved Intra Prediction of H.264/AVC," Effective Video Coding for Multimedia Applications, Chapter 3, Apr. 26, 2011, pp. 39-54.

Wang et al., "A Novel Fast Algorithm for Intra Mode Decision in H.264/AVC Encoders", 2006 IEEE International Symposium on Circuits and Systems, May 21, 2006, 4 pp.

Xu et al., "Improvements for SDIP", JCTVC-G354, Joint Collaborative Team on Video Coding, Nov. 21-30, 2011, 3 pp.

Wiegand et al., "WD1: Working Draft 1 of High-Efficiency Video Coding", JCTVC-C403, 3rd Meeting: Guangzhou, CN, Oct. 7-15, 2010, 137 pp.

Wiegand et al., "WD2: Working Draft 2 of High-Efficiency Video Coding," JCTVC-D503, 4th Meeting: Daegu, KR, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011, 193 pp.

Bross et al., "WD4: Working Draft 4 of High-Efficiency Video Coding," 6th Meeting: JCTVC-F803_d2, Torino, IT, Jul. 14-22, 2011, 226 pp.

Bross et al., "WD5: Working Draft 5 of High-Efficiency Video Coding," 7th Meeting: Geneva, Switzerland, Nov. 21-30, 2011, JCTVC-G1103_d2, 214 pp.

Bross et al., "High efficiency video coding (HEVC) text specification draft 6," 8th Meeting: San Jose, CA, USA, Feb. 1-10, 2012, JCTVC-H1003, 259 pp.

Bross et al., "High efficiency video coding (HEVC) text specification draft 7," 9th Meeting: Geneva, CH, Apr. 27-May 7, 2012, JCTVC-I1003_d2, 290 pp.

Bross et al., "High efficiency video coding (HEVC) text specification draft 8," 10th Meeting: Stockholm, SE, Jul. 11-20, 2012, JCTVC-J1003_d7, 261 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

Response to Written Opinion dated Jul. 6, 2012 from International Application No. PCT/US2012/040510, filed Dec. 21, 2012, 33 pp.

Second Written Opinion from International Application No. PCT/US2012/040510, dated May 15, 2013, 7 pp.

Response to Second Written Opinion from International Application No. PCT/US2012/040510, filed Jul. 15, 2013, 31 pp.

International Preliminary Report on Patentability from International Application No. PCT/US2012/040510, dated Aug. 5, 2013, 22 pp.

Bross et al., "High efficiency video coding (HEVC) text specification draft 9," 11th Meeting: Shanghai, CN, Oct. 10-19, 2012, JCTVC-K1003_v7, 290 pp.

Bross et al., "High efficiency video coding (HEVC) text specification draft 10 (for FDIS & Last Call)," 12th Meeting: Geneva, CH, Jan. 14-23, 2013, JCTVC-L1003_v34, 310 pp.

Lim et al., "Description of video coding technology proposal by SK telecom, Sejong Univ. and Sungkyunkwan Univ.," Apr. 15-23, 2010 Document: JCTVC-A113, Dresden, DE, Mar. 19, 2012, 41 pp.

Guo M., et al., "CE14 Subtest 1:The Most Probable Mode Signaling for Luma", th Meeting: Geneva, Switzerland, 1March 16-23, 2011, Joint Collaborative Team on Video Coding (JCT-VC) of ITU-T SG16 WP3 and ISO/IEC JTC1/SC29/WG11, JCTVC-E088_V2, Mar. 18, 2011, 4pp.

* cited by examiner

INTRA PREDICTION MODE CODING WITH DIRECTIONAL PARTITIONS

This application claims priority to U.S. Provisional Application No. 61/493,331 filed 3 Jun. 2011; U.S. Provisional Application No. 61/554,334 filed 1 Nov. 2011; and, U.S. Provisional Application No. 61/586,597 filed 13 Jan. 2012, the entire contents each of which are hereby incorporated by reference in their respective entireties.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques for signaling intra prediction modes for video coding. The techniques may, for example, be used when signaling intra prediction modes for blocks of video data with directional (i.e. non-square) partitions. Directional partitions may, for example, be asymmetric partitions, partitions used in 2N×N or N×2N coding modes, or short distance intra prediction mode partitions. As will be explained in greater detail below, directional partitions can generally be considered to be either horizontal or vertical.

In one example, a method of encoding video data includes partitioning a block of video data using non-square partitions; determining a most probable intra prediction mode for the block based at least in part on a direction of the non-square partitions; and, coding data representative of an actual intra prediction mode for the block based at least in part on the determined most probable intra prediction mode.

In another example, an apparatus for coding video data includes a video encoder configured to partition a block of video data using non-square partitions; determine a most probable intra prediction mode for the block based at least in part on a direction of the non-square partitions; and code data representative of an actual intra prediction mode for the block based at least in part on the determined most probable intra prediction mode.

In another example, a method of decoding video data includes receiving a block of video data; determining the block of video data is partitioned using non-square partitions; determining a most probable intra prediction mode for the block based at least in part on a direction of the non-square partitions; decoding data representative of an actual intra prediction mode for the block based at least in part on the determined most probable intra prediction mode; and calculating prediction data for the non-square partitions using the actual intra prediction mode.

In another example, an apparatus for coding video data includes a video decoder configured to receive a block of video data; determine the block of video data is partitioned using non-square partitions; determine a most probable intra prediction mode for the block based at least in part on a direction of the non-square partitions; decode data representative of an actual intra prediction mode for the block based at least in part on the determined most probable intra prediction mode; and calculate prediction data for the non-square partitions using the actual intra prediction mode.

In another example, an apparatus includes means for partitioning a block of video data using non-square partitions; means for determining a most probable intra prediction mode for the block based at least in part on a direction of the non-square partitions; and, means for coding data representative of an actual intra prediction mode for the block based at least in part on the determined most probable intra prediction mode.

In another example, a computer readable storage medium storing instructions that upon execution cause one or more processors to partition a block of video data using non-square partitions; determine a most probable intra prediction mode for the block based at least in part on a direction of the non-square partitions; and, code data representative of an actual intra prediction mode for the block based at least in part on the determined most probable intra prediction mode.

In another example, an apparatus includes means for receiving a block of video data; means for determining the block of video data is partitioned using non-square partitions; means for determining a most probable intra prediction mode for the block based at least in part on a direction of the non-square partitions; means for decoding data representative of an actual intra prediction mode for the block based at least in part on the determined most probable intra prediction mode; and means for calculating prediction data for the non-square partitions using the actual intra prediction mode.

In another example, a computer readable storage medium storing instruction that upon execution cause one or more processors to receive a block of video data; determine the block of video data is partitioned using non-square partitions; determine a most probable intra prediction mode for the block based at least in part on a direction of the non-square partitions; decode data representative of an actual intra prediction mode for the block based at least in part on the determined most probable intra prediction mode; and calculate prediction data for the non-square partitions using the actual intra prediction mode.

DETAILED DESCRIPTION

Figure 1:
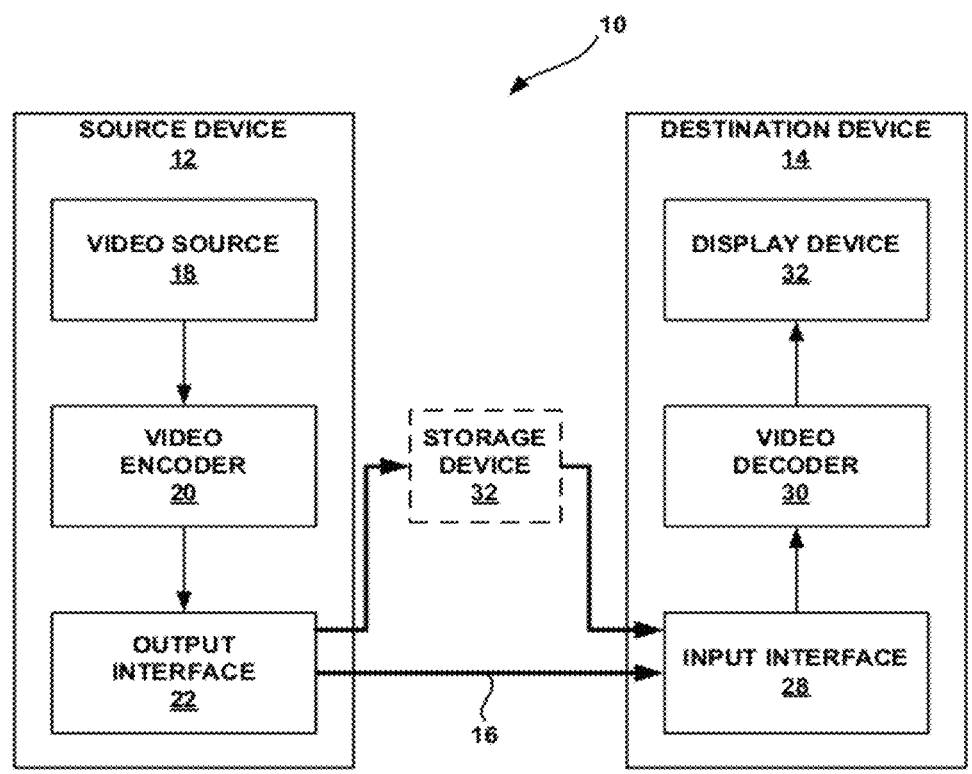
FIG. 1 is a block diagram illustrating an example video encoding and decoding system that may implement the coding techniques described in this disclosure.

In general, this disclosure describes techniques for signaling intra prediction modes for video coding. The techniques may, for example, be used when signaling intra prediction modes for blocks of video data with directional (i.e. non-square) partitions. Directional partitions may, for example, be partitions used in asymmetric motion partitioning, partitions used in 2N×N or N×2N coding modes, or short distance intra prediction mode partitions. In general, the term non-square can be used to describe any non-square, rectangular block, e.g., a block having a width (in units of pixels) greater than its height or its height greater than its width.

Video data includes a sequence of frames (or pictures) played in rapid succession to simulate motion. Each of the frames may be divided into blocks. Video encoders attempt to compress video data by taking advantage of spatial and temporal redundancy between blocks. For example, a video encoder may take advantage of spatial redundancy by predicting a block relative to neighboring, previously coded blocks, using a technique generally referred to as intra prediction. Likewise, a video encoder may take advantage of temporal redundancy by predicting a block relative to data of previously coded frames using a technique generally referred to as inter prediction. In particular, the video encoder predicts a current block from data of a spatial neighbor or from data of a previously coded frame, then calculates a residual value for the block as a difference between the actual value for the block and the predicted value for the block. The video encoder uses prediction units (PUs) to represent prediction data for a coding unit (CU) and transform units (TUs) to represent residual data. The residual data for a block includes pixel-by-pixel difference values in the pixel (or spatial) domain. The video encoder may further transform the residual data, representing the data in the transform domain.

Conventionally, intra prediction mode coding has involved the use of square (i.e. 2N×2N) blocks of pixels. That is, a video coding device, such as a video encoder or a video decoder, may predict each of the pixels of a 2N×2N block from pixels of neighboring, previously coded blocks. Short-distance intra prediction (SDIP) has been introduced for High Efficiency Video Coding (HEVC). SDIP can involve partitioning a 2N×2N block into four parallel rectangular partitions, predicting the first partition from pixels of neighboring, previously coded blocks, and then predicting subsequent partitions from at least some of the pixels of the previously coded partitions.

The SDIP partitions may be horizontal or vertical, and in some cases, SDIP partitions may be further partitioned. For example, a 16×16 CU may be partitioned into four 4×16 SDIP PUs, and one or more of the four 4×16 SDIP PUs may be partitioned into 1×16 PUs. The techniques of this disclosure will generally be described with reference to SDIP partitions for purposes of explanation, but the techniques may also be applicable to other types of non-square partitions. For example, the techniques of this disclosure may also be used in conjunction with N×2N intra prediction modes and 2N×N intra prediction modes, or other scenarios where blocks have widths that are different lengths, in units of pixels, than heights.

After a block has been encoded, a video decoder may receive coded data for the block. The coded data may include a representation of the intra prediction mode used to encode the block, as well as an indication of partitioning of PUs for the block. In this manner, the video decoder may use the same partitioning of PUs and apply the same intra prediction mode to decode the block. To reduce the amount of bits consumed in signaling the intra prediction mode, video coding devices may determine likelihoods of coding modes for a current block based on coding modes of neighboring blocks.

Assume for purposes of example that blocks A, B, and C are blocks of an intra-predicted frame or slice and correspond, respectively, to a left-neighboring block, an above-neighboring block, and a current block to be coded. A video coding device, such as a video encoder or a video decoder, may determine most probable intra prediction modes for block C based on intra prediction modes of blocks A and B. In general, block C is more likely to be predicted using the mode of either block A or block B than it is to be predicted using another mode. Typically, when blocks A and B have the same intra prediction mode, the most probable intra prediction mode for block C is the intra prediction mode of blocks A and B. On the other hand, when blocks A and B have different intra prediction modes, a video coding device can determine whether the intra prediction mode for block C is more likely to be the intra prediction mode of block A or the intra prediction mode of block B.

This disclosure provides techniques for selecting the intra prediction mode of block A or the intra prediction mode of block B as the most probable intra prediction mode for block C, given the introduction of SDIP partitioning. As noted above, the partitioning of a CU, e.g., block C, may be signaled separately from the intra prediction mode used to predict the PUs of the block.

In accordance with the techniques of this disclosure, when block C is partitioned using SDIP, the direction of the SDIP partitions may influence whether the intra prediction mode for block A is more or less probable than the intra prediction mode for block B, as a candidate intra prediction mode for block C. For example, when block C is partitioned into vertical SDIP PUs, the intra prediction mode for block A (e.g. a left-neighboring block) may be treated as the most probable intra prediction mode for block C. As another example, when block C is partitioned into horizontal SDIP PUs, the intra prediction mode for block B (e.g. an above-neighboring block) may be treated as the most probable intra prediction mode for block C. As noted above, in other examples, when block C includes a partition having a width that is longer, in units of pixels, than its height, horizontal intra-prediction modes may be considered more likely than vertical intra-prediction modes, whereas when block C includes a partition having a height that is longer than its width, vertical intra-prediction modes may be considered more likely than horizontal intra-prediction modes.

After a most probable intra prediction mode has been determined for block C, a video coding device may code a representation of the intra prediction mode that is actually used to predict block C. This coding of the representation may be based on the determined most-probable mode. For example, a coding device may code a value of a one-bit flag representative of whether the actual intra prediction mode for block C is the most probable intra prediction mode. If the most probable intra prediction mode is the same as the actual intra prediction mode, no further data need be coded. In some instances, a video coding device may utilize more than one most probable intra prediction mode when coding a representation of the intra prediction mode that is actually used to predict block C. In such a configuration that utilizes multiple most probable intra prediction modes, the direction of the SDIP partitions may, for example, be used to determine which of the most probable intra prediction modes has the greatest likelihood of being the actual intra prediction mode.

When the actual intra prediction mode is not the same as the most probable intra prediction mode, the video coding device may code additional data representative of the actual intra prediction mode. To do so, the video coding device may use a candidate mode list (e.g. a codeword table), which may include a list of potential intra prediction modes in an order approximating most probable to least probable. The video coding device may be configured with a variety of such lists. Each list may map codewords (e.g. unique binary values) to intra prediction mode indexes. In accordance with the techniques of this disclosure, the video coding device may select one of the lists based on whether the block is predicted using SDIP, and if so, the direction of the SDIP PUs.

Furthermore, in some examples, certain intra prediction modes may be configured as unavailable for use by a video encoder or decoder, depending on SDIP directions. For example, for vertical SDIP PUs, horizontal intra prediction modes (e.g., the horizontal intra prediction mode and modes that are directionally similar) may be unavailable. Likewise, for horizontal SDIP PUs, vertical intra prediction modes may be unavailable. Therefore, the candidate mode lists may omit entries for modes that are determined to be unavailable based on the direction of SDIP PUs, in accordance with the techniques of this disclosure. In this manner, the candidate mode list may omit entries for modes that are perpendicular and/or substantially perpendicular to the direction of the SDIP PUs. In other examples, the candidate mode list selected for a block to be predicted using SDIP partitions may not omit perpendicular and/or substantially perpendicular intra prediction modes, but instead, may assign the perpendicular and/or substantially perpendicular intra prediction modes longer codewords based on the perpendicular and/or substantially perpendicular intra prediction modes being less likely compared to other intra prediction modes.

FIG. 1 is a block diagram illustrating an example video encoding and decoding system 10 that may utilize the techniques described in this disclosure. As shown in FIG. 1, system 10 includes a source device 12 that generates encoded video data to be decoded at a later time by a destination device 14. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via a link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

Alternatively, encoded data may be output from output interface 22 to a storage device 32. Similarly, encoded data may be accessed from storage device 32 by input interface 28. Storage device 32 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 32 may correspond to a file server or another intermediate storage device that may hold the encoded video generated by source device 12. Destination device 14 may access stored video data from storage device 32 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 32 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, video encoder 20 and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

The captured, pre-captured, or computer-generated video may be encoded by video encoder 12. The encoded video data may be transmitted directly to destination device 14 via output interface 22 of source device 20. The encoded video data may also (or alternatively) be stored onto storage device 32 for later access by destination device 14 or other devices, for decoding and/or playback.

Destination device 14 includes an input interface 28, a video decoder 30, and a display device 32. In some cases, input interface 28 may include a receiver and/or a modem. Input interface 28 of destination device 14 receives the encoded video data over link 16. The encoded video data communicated over link 16, or provided on storage device 32, may include a variety of syntax elements generated by video encoder 20 for use by a video decoder, such as video decoder 30, in decoding the video data. Such syntax elements may be included with the encoded video data transmitted on a communication medium, stored on a storage medium, or stored a file server.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

Video encoder 20 and video decoder 30 may operate according to a video compression standard, such as the upcoming High Efficiency Video Coding (HEVC) standard. The techniques of this disclosure, however, are not limited to any particular coding standard. Other examples include ITU-T H.264 standard, alternatively referred to as MPEG-4, Part 10, Advanced Video Coding (AVC), MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

The ITU-T H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. The Joint Video Team (JVT) continues to work on extensions to H.264/MPEG-4 AVC. Similar to the JVT, VCEG and MPEG have established the Joint Collaborative Team on Video Coding (JCT-VC) for developing HEVC.

The HEVC test model (HM) describes that a video frame or picture may be divided into a sequence of treeblocks or largest coding units (LCU) that include both luma and chroma samples. A treeblock has a similar purpose as a macroblock of the H.264 standard. A slice includes a number of consecutive treeblocks in coding order. A video frame or picture may be partitioned into one or more slices. Each treeblock may be split into coding units (CUs) according to a quadtree. For example, a treeblock, as a root node of the quadtree, may be split into four child nodes, and each child node may in turn be a parent node and be split into another four child nodes. A final, unsplit child node, as a leaf node of the quadtree, comprises a coding node, i.e., a coded video block. Syntax data associated with a coded bitstream may define a maximum number of times a treeblock may be split, and may also define a minimum size of the coding nodes.

A CU includes a coding node and prediction units (PUs) and transform units (TUs) associated with the coding node.

A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

In general, a PU includes data related to the prediction process. For example, when the PU is intra-mode encoded, the PU may include data describing an intra prediction mode for the PU. As another example, when the PU is inter-mode encoded, the PU may include data defining a motion vector for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

In general, a TU is used for the transform and quantization processes. A given CU having one or more PUs may also include one or more transform units (TUs). Following prediction, video encoder 20 may calculate residual values corresponding to the PU. The residual values comprise pixel difference values that may be transformed into transform coefficients, quantized, and scanned using the TUs to produce serialized transform coefficients for entropy coding. This disclosure typically uses the term "video block" to refer to a coding node of a CU. In some specific cases, this disclosure may also use the term "video block" to refer to a treeblock, i.e., LCU, or a CU, which includes a coding node and PUs and TUs.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom. The techniques of this disclosure may also be applicable to intra prediction based on partitions such as the asymmetric partitions described above for inter prediction.

The HM may be configured with short distance intra prediction (SDIP) prediction modes. In SDIP, a video coding device may partition a block (e.g., a leaf-node CU) into a number of parallel prediction units (PUs). For example, the HM may partition a 16×16 CU into four 4×16 or four 16×4 PUs that are predicted using SDIP. For SDIP, the video coding device predicts a first one of the PUs from values for neighboring pixels of a previously coded block to the current CU. After coding the region of the CU corresponding to the first PU, the video coding device predicts a next one of the PUs of the current CU from neighboring pixels of the previously coded PU of the current CU. Thus, rather than using pixels exclusively from previously coded CUs as reference pixels for intra prediction, in SDIP, pixels within the same CU may be used as reference pixels for other pixels of the CU. Of course, depending on the intra prediction direction, pixels of previously coded CUs may also be used for reference in calculating predicted values for a current PU of the current CU as well as pixels of a previously coded PU of the current CU. Pixel values are also referred to as "samples" in the upcoming HEVC standard, which refers to luminance or "luma" samples and chrominance or "chroma" samples.

Various SDIP PU partitioning schemes may be provided, e.g., based on the size of the current CU. In general, SDIP PUs for an N×N CU may have sizes of (N/4)×N or N×(N/4), where N is an integer greater than or equal to 4. Other sizes and partitioning schemes may also be available, e.g., N×1 or 1×N for an N×N CU. Table 1 below provides several example partitioning schemes that may be available for constructing SDIP PUs based on the size of the current CU. SDIP PUs of HEVC may have various rectangular sizes per CU.

TABLE 1

| CU Size | SDIP PU Sizes Available |
| --- | --- |
| 32×32 | 8×32, 32×8 |
| 16×16 | 4×16, 16×4, 1×16, 16×1 |
| 8×8 | 2×8, 8×2 |

Figure 2A:
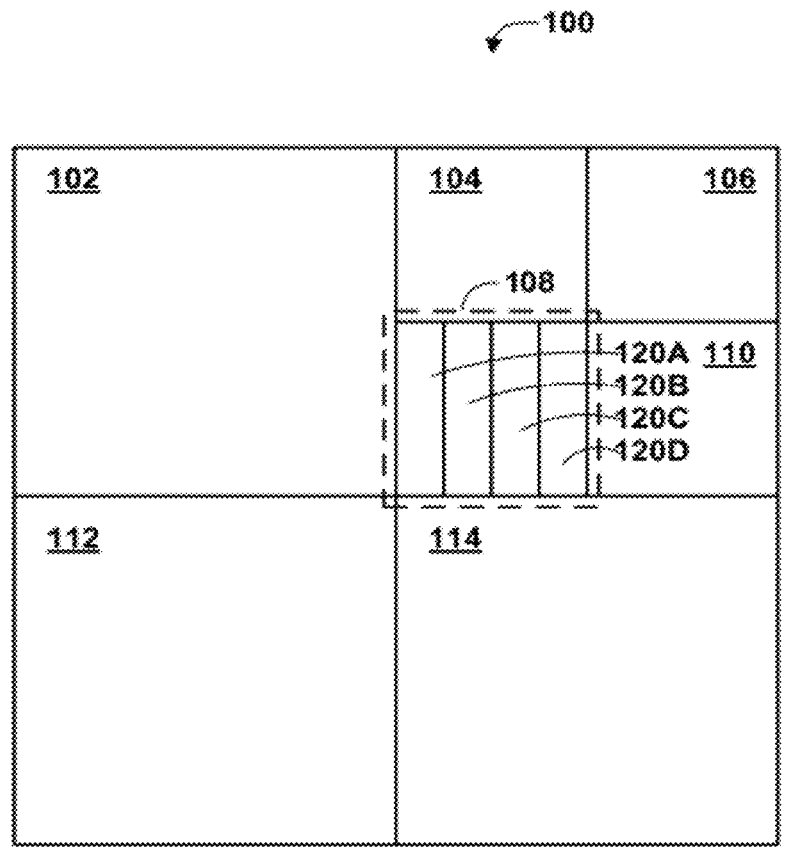
FIG. 2A is a conceptual diagram illustrating an example largest coding unit (LCU) including an SDIP-predicted CU.

FIG. 2A is a conceptual diagram illustrating an example LCU 100 including an SDIP-predicted CU. In particular, LCU 100 includes sub-CUs 102, 104, 106, 108, 110, 112, and 114, in this example. Each of sub-CUs 102, 104, 106, 108, 110, 112, and 114 corresponds to a leaf node CU. A non-leaf node CU would include sub-CUs 104, 106, 108, and 110 as well, in this example. Each of the leaf node sub-CUs may be predicted according to a particular prediction mode. In this example, sub-CU 108 is predicted using SDIP. Accordingly, sub-CU 108 includes four PUs 120A-

120D (PUs 120). As shown in this example, PUs 120 are horizontal PUs of sub-CU 108.

Figure 2B:
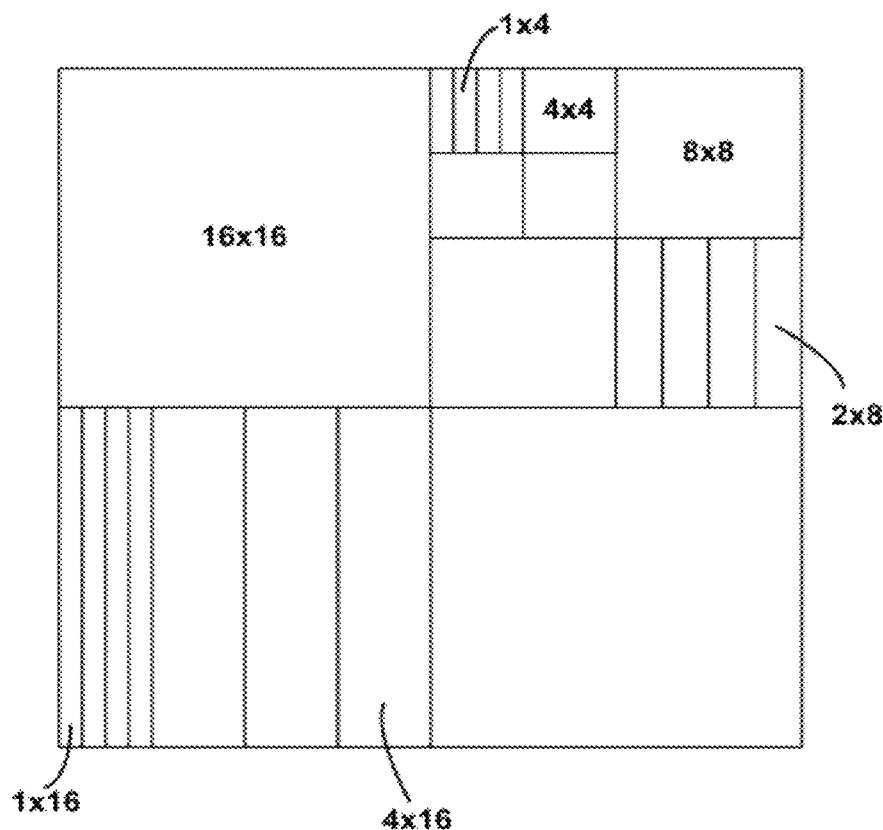
FIGS. 2B and 2C are conceptual diagrams illustrating examples of SDIP-predicted CUs of various sizes.
Figure 2C:
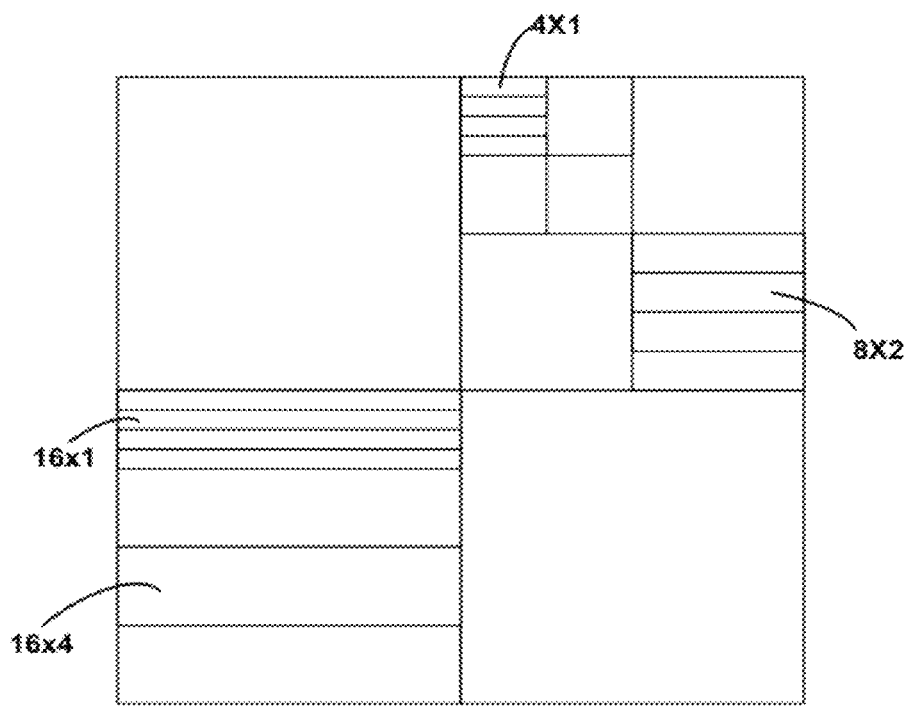

FIGS. 2B and 2C are conceptual diagrams showing examples of alternative SDIP PU partition sizes, such as the partition sizes listed above in TABLE 1. FIG. 2B shows examples of vertical SDIP partitions of various sizes, and FIG. 2C shows examples of horizontal SDIP partitions of various sizes.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

In some examples, video encoder 20 may utilize a pre-defined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context adaptive variable length coding (CAVLC), context adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

Figure 3:
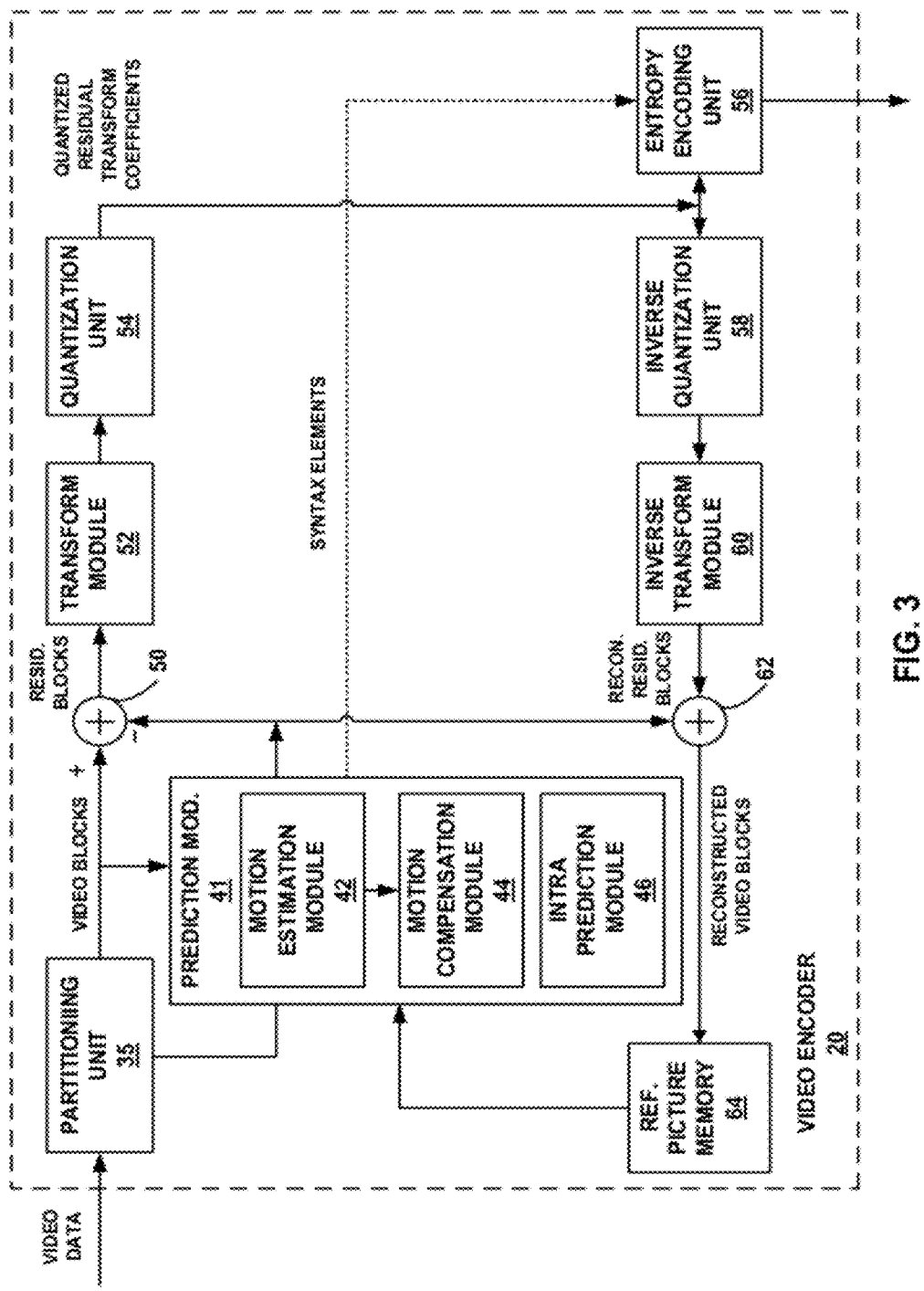
FIG. 3 is a block diagram illustrating an example video encoder that may implement the coding techniques described in this disclosure.

FIG. 3 is a block diagram illustrating an example video encoder 20 that may implement the SDIP coding techniques described in this disclosure. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 3, video encoder 20 includes a partitioning unit 35, prediction module 41, reference picture memory 64, summer 50, transform module 52, quantization unit 54, and entropy encoding unit 56. Prediction module 41 includes motion estimation unit 42, motion compensation unit 44, and intra prediction module 46. For video block reconstruction, video encoder 20 also includes inverse quantization unit 58, inverse transform module 60, and summer 62. One or more loop filters (in loop or post loop) such as a deblocking filter, adaptive loop filter, and/or sample adaptive offset (SAO) filter (not shown in FIG. 3) may also be included to filter reconstructed video blocks. If desired, theses one or more loop filters would typically filter the output of summer 62. Additional loop filters (in loop or post loop) may also be used.

As shown in FIG. 3, video encoder 20 receives video data, and partitioning unit 35 partitions the data into video blocks. This partitioning may also include partitioning into slices, tiles, or other larger units, as wells as video block partitioning, e.g., according to a quadtree structure of LCUs and CUs. Video encoder 20 generally illustrates the components that encode video blocks within a video slice to be encoded. The slice may be divided into multiple video blocks (and possibly into sets of video blocks referred to as tiles). Prediction module 41 may select one of a plurality of possible coding modes, such as one of a plurality of intra coding modes or one of a plurality of inter coding modes, for the current video block based on error results (e.g., coding rate and the level of distortion). As part of selecting a coding mode, prediction module 41 may try various partitioning strategies and select a partitioning strategy that results in desirable error results. These partitioning strategies can include the use of both square and non-square partitions. Prediction module 41 may provide the resulting intra- or inter-coded block to summer 50 to generate residual block data and to summer 62 to reconstruct the encoded block for use as a reference picture.

Intra prediction module 46 within prediction module 41 may perform intra-predictive coding of the current video block relative to one or more neighboring blocks in the same frame or slice as the current block to be coded to provide spatial compression. Motion estimation unit 42 and motion compensation unit 44 within prediction module 41 perform inter-predictive coding of the current video block relative to one or more predictive blocks in one or more reference pictures to provide temporal compression.

If inter prediction rather than intra prediction is selected for a current video block, motion estimation unit 42 may be configured to determine the inter-prediction mode for a video slice according to a predetermined pattern for a video sequence. The predetermined pattern may designate video slices in the sequence as P slices, B slices or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by video decoder 30 in decoding the video blocks of the video slice.

Intra prediction module 46 may intra-predict a current block, as an alternative to the inter-prediction performed by motion estimation unit 42 and motion compensation unit 44, as described above. In particular, intra prediction module 46 may determine an intra prediction mode to use to encode a current block. In some examples, intra prediction module 46 may encode a current block using various intra prediction modes, e.g., during separate encoding passes, and intra prediction module 46 (or mode select unit 40, in some examples) may select an appropriate intra prediction mode to use from the tested modes. For example, intra prediction module 46 may calculate rate-distortion values using a rate-distortion analysis for the various tested intra prediction modes, and select the intra prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra prediction module 46 may calculate ratios from the distortions and rates for the various encoded blocks to determine which intra prediction mode exhibits the best rate-distortion value for the block.

Figure 4:
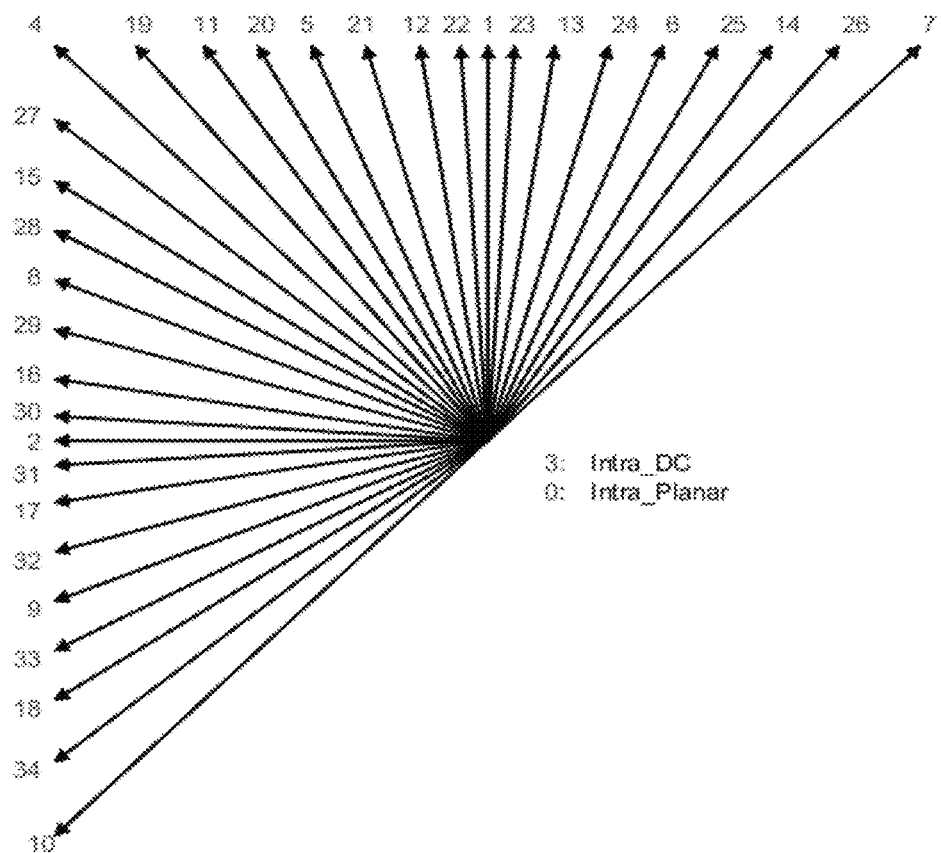
FIG. 4 shows an example of intra prediction modes that may be used with the techniques of this disclosure.

FIG. 4 shows examples of intra prediction modes and corresponding mode indexes that may be used with HEVC. The arrows of FIG. 4 generally represent a prediction direction, and the numbers represent a mode index. The mode index serves as an identifier of the corresponding intra prediction mode. As will be explained in greater detail below, candidate mode lists may map codewords to mode indexes, such that video encoder 20 can generate the codeword as a means for signaling the mode index of a selected intra prediction mode. Video encoder 20 may maintain or generate multiple candidate mode lists with different mappings of codewords to the mode indexes. Based on a coding context, video encoder 20 can select a particular candidate mode list such that the intra prediction modes that are most likely in a particular context are mapped to shorter codewords while the intra prediction modes that are less likely are mapped to longer codewords. For CUs coded using SDIP partitions, the selection of a candidate mode list may be based on a direction of SDIP partitions. For example, if a CU has vertical SDIP partitions, video encoder 20 may select a candidate mode list where intra prediction modes perpendicular or substantially perpendicular to the SDIP partitions are mapped to longer codewords, indicating that those intra prediction modes are typically less probable than other intra prediction modes.

According to the techniques of this disclosure, when video encoder 20 is coding a CU using an SDIP mode, video encoder 20 may select an actual prediction mode from a candidate mode list that includes fewer intra prediction modes than the number of intra prediction modes shown above in Table 2. In particular, video encoder 20 may select an actual prediction mode from a candidate mode list that omits entries for intra prediction modes that are substantially perpendicular to the direction of the SDIP partitions. For example, referring to FIG. 4, for a CU being predicted using horizontal SDIP partitions, video encoder 20 may select an actual intra prediction mode from a candidate mode list that omits an entry for vertical prediction mode 1 or entries for substantially vertical prediction modes 12, 22, 23, and 13. Similarly, for a CU being predicted using vertical SDIP partitions, video encoder 20 may select an actual intra prediction mode from a candidate mode list that omits an entry for horizontal prediction mode 2 or entries for substantially horizontal intra prediction modes 16, 30, 31, and 17. In various implementations, more or fewer substantially perpendicular prediction modes may be omitted from a candidate mode list.

After selecting an intra prediction mode for a block, intra prediction module 46 may provide information indicative of the selected intra prediction mode for the block to entropy encoding unit 56. Entropy encoding unit 56 may encode the information indicating the selected intra prediction mode in accordance with the techniques of this disclosure.

Entropy encoding unit 56 may signal the selected (i.e. actual) intra prediction mode for a block based on one or more most probable intra prediction modes for the block. As will be explained in greater detail below, the determination of the one or more most probable intra prediction modes may be based on a direction of SDIP partitions for the block. In examples using one most probable intra prediction mode, entropy encoding unit 56 may generate a first syntax element, such as a 1-bit flag, to indicate if the actual intra prediction mode for the block is the same as the most probable intra prediction for the block. If the actual intra prediction mode for the block is the same as the most probable intra prediction mode for the block, then entropy encoding unit 56 does not need to generate any additional syntax to identify the actual intra prediction mode for the block. If the actual intra prediction mode is not the most probable intra prediction mode, then entropy encoding unit 56 may generate additional syntax to identify the actual intra prediction mode. The additional syntax may, for example, be a codeword used to identify the actual intra prediction mode for the block. The codeword may map to the actual intra prediction mode on a candidate mode list.

In examples where entropy encoding unit 56 signals the selected intra prediction mode based on two most probable intra prediction modes, entropy encoding unit 56 may generate a first bit to indicate if the actual intra prediction mode is one of the two most probable intra prediction modes. If the actual intra prediction mode is one of the two most probable intra prediction modes, then entropy encoding unit 56 may generate a second bit indicating which of the two most probable intra prediction modes is the actual intra prediction mode. If the selected intra prediction mode is not one of the two most probable intra prediction modes, then entropy encoding unit 56 may generate additional syntax to identify the actual intra prediction mode. The additional syntax may, for example, be a codeword used to identify the actual intra prediction mode for the block. The codeword may map to an intra prediction mode on a candidate mode list.

In another example, entropy encoding unit 56 may signal the selected intra prediction mode using three most probable modes. In such an example, entropy encoding unit 56 may generate a first bit to indicate if the actual intra prediction mode is one of the three most probable intra prediction modes. If the actual intra prediction mode is one of the three most probable intra prediction modes, then entropy encoding unit 56 may generate additional bits indicating which of the three most probable intra prediction modes is the actual intra prediction mode. Entropy encoding unit 56 may signal which of the three most probable modes is the actual intra prediction mode using codewords of variable length. For example, a one-bit codeword (e.g. 0) may indicate the actual intra prediction mode is the first most probable mode, while two-bit codewords (e.g. 10 and 11) may indicate the actual intra prediction mode is one of the second or third most probable modes. As will be explained in greater detail below, the techniques of this disclosure may be used to determine if the first most probable mode, which may be signaled with a one bit codeword, corresponds to the intra prediction mode of an above-neighboring block or a left-neighboring block. By assigning more likely modes to the first most probable mode instead of the second or third most probable modes, a bit savings may be achieved due to the first most probable mode being signaled using a one-bit codeword instead of a two bit codeword. In this context, "more likely" refers to the likelihood that a candidate mode is selected as the actual intra prediction mode.

When using three most probable modes, if the selected intra prediction mode is not one of the three most probable intra prediction modes, then entropy encoding unit 56 may generate additional syntax to identify the actual intra prediction mode. The additional syntax may, for example, be a codeword used to identify the actual intra prediction mode for the block. The codeword may map to an intra prediction mode on a candidate mode list. The candidate mode list may, for example, exclude the three most probable modes, as the first bit already indicates that the actual intra prediction mode is not one of the three most probable modes.

Figure 5:
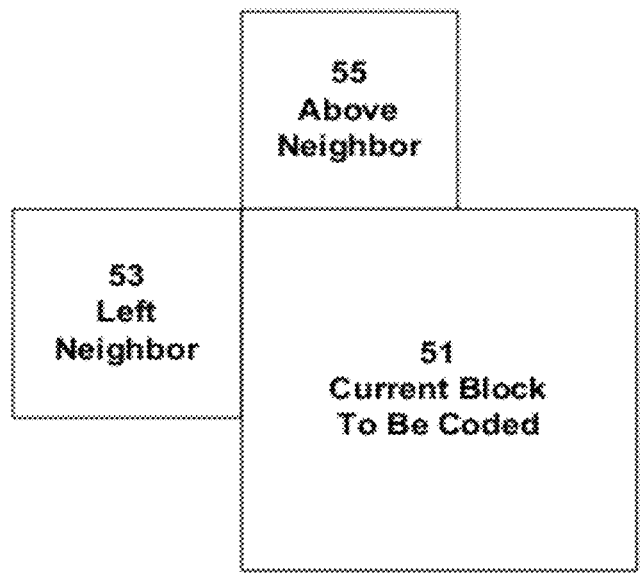
FIG. 5 shows an example of a current block being coded, a left-neighboring, previously coded block relative to the current block, and an above-neighboring, previously coded block relative to the current block.

As introduced above, the selection of the one or more most probable intra prediction modes may be based on the intra prediction modes used to code already coded, neighboring blocks. FIG. 5 shows an example of three video blocks, including block 51, which represents a block currently being coded. Block 51 has an already coded block above it (above neighbor block 55) and an already coded block to its left (left neighbor block 53). Assuming video encoder 20 is implementing a raster scan order, i.e. coding blocks from left to right and top to bottom, then blocks 55 and 53 are coded prior to block 51 being coded. Therefore, information related to blocks 55 and 53 may be used to code block 51.

In accordance with the techniques of this disclosure, when block 51 is partitioned using SDIP, the direction of the SDIP partitions may influence whether the intra prediction mode for block 55 is more or less probable than the intra prediction mode for block 53 as a candidate intra prediction mode for block 55. For example, when block 51 is partitioned into vertical SDIP PUs, the intra prediction mode for block 53 may be treated as the most probable intra prediction mode for block 51. As another example, when block 51 is partitioned into horizontal SDIP PUs, the intra prediction mode for block 55 may be treated as the most probable intra prediction mode for block 51. In other examples, this may be reversed, with the intra prediction mode for block 55 being the most probable intra prediction mode for block 51 when block 51 is partitioned into horizontal SDIP partitions, and the intra prediction mode for block 53 being the most probable intra prediction mode for block 51 when block 51 is partitioned into vertical SDIP partitions.

In examples where entropy encoding unit 56 uses three most probable modes, as described above, the direction of the SDIP partitions for block 51 may be used to determine which of blocks 53 and 55 are used to determine the first most probable mode. In examples, where blocks 53 and 55 are coded using the same intra prediction mode, then the first most probable mode may correspond to the intra prediction mode of blocks 53 and 55, while the second and third most probable modes are selected based on some other criteria. The other criteria may, for example, involve choosing intra predictions modes with prediction angles close to the angle of the intra prediction mode of blocks 53 and 55, may involve always selecting the same mode (e.g. always DC or always planar), or may involve some other criteria.

In examples, where blocks 53 and 55 are coded using different intra prediction modes, entropy encoding unit 56 may select each of the different intra prediction modes to be used as a most probable mode. According to the techniques of this disclosure, which of the two modes entropy encoding unit 56 selects as the first most probable intra prediction mode may be based on a direction of the SDIP partitions of block 51. For example, if block 51 is partitioned into vertical SDIP PUs, then entropy encoding unit 56 may select the intra prediction mode of block 53 as the first most probable mode, select the intra prediction mode of block 55 as the second most probable mode may, and select the third most probable mode using some other criteria. If block 51 is partitioned into horizontal SDIP PUs, then entropy encoding unit 56 may select the intra prediction mode of block 55 as the first most probable mode, select the intra prediction mode of block 53 as the second most probable mode may, and select the third most probable mode using some other criteria. As the first most probable mode is signaled using a one-bit codeword and the second most probable mode is signaled using a two-bit codeword according to this example, a bit savings may be achieved by assigning the more likely occurring intra prediction mode to the first most probable mode.

Although the techniques of this disclosure thus far have been generally described with regards to horizontal and vertical partitions and without reference to specific sizes, it should be noted that the techniques may be applied to all sizes of SDIP partitions, such as the example sizes included in Table 1 above. Additionally, in some implementations, the techniques of this disclosure may also be implemented only for SDIP partitions of particular sizes as opposed to all SDIP partitions. As one example, for CUs with 1×16 or 16×1 SDIP partitions, most probable intra prediction modes and candidate mode lists may be determined according to the techniques described above, while for SDIP partitions of other sizes, intra prediction modes and candidate mode lists are determined using other techniques.

After prediction module 41 generates the predictive block for the current video block, video encoder 20 forms a residual video block by subtracting the predictive block from the current video block. The residual video data in the residual block may be included in one or more TUs and applied to transform module 52. Transform module 52 transforms the residual video data into residual transform coefficients using a transform, such as a discrete cosine transform (DCT) or a conceptually similar transform. Transform module 52 may convert the residual video data from a pixel domain to a transform domain, such as a frequency domain.

Transform module 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors and the other syntax elements for the current video slice being coded. As part of performing CABAC, entropy encoding unit 56 may use a selected candidate mode list (e.g. a codeword table) as a binarization table, meaning the candidate mode list can be used to determine a binary representation of the selected intra prediction mode. Entropy coding unit 56 may then perform arithmetic coding on the binary representation of the selected intra prediction mode.

Inverse quantization unit 58 and inverse transform module 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within one of the reference picture lists. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in reference picture memory 64. The reference block may be used by motion estimation unit 42 and motion compensation unit 44 as a reference block to inter-predict a block in a subsequent video frame or picture.

In this manner, video encoder 20 of FIG. 3 represents an example of a video encoder configured to partition a block of video data using non-square partitions; determine a most probable intra prediction mode for the block based at least in part on a direction of the non-square partitions; code data representative of an actual intra prediction mode for the block based at least in part on the determined most probable intra prediction mode; and calculate prediction data for the non-square partitions using the actual intra prediction mode. When determining the most probable intra prediction mode, video encoder 20 can also be configured to select an intra prediction mode of a left-neighboring block as the most probable intra prediction mode when the direction of the non-square partitions is vertical, and select an intra prediction mode of an above-neighboring block as the most probable intra prediction mode when the direction of the non-square partitions is horizontal. When the intra prediction mode of a left-neighboring block is different than the intra prediction mode of an above-neighboring block and when the direction of the non-square partitions is vertical, video encoder 20 may select the intra prediction mode of the left-neighboring block as the most probable intra prediction mode. When the intra prediction mode of a left-neighboring block is different than the intra prediction mode of an above-neighboring block and when the direction of the non-square partitions is horizontal, video encoder 20 may select the intra prediction mode of the above-neighboring block as the most probable intra prediction mode.

When coding the data representative of the actual intra prediction mode, video encoder 20 can be configured to determine a value for a flag. The value of the flag can be indicative of whether the actual intra prediction mode is the same as the most probable intra prediction mode. When coding the data representative of the actual prediction mode comprises, video encoder 20 can be configured to select a candidate mode list based on the direction of the non-square partitions and code the data representative of the actual prediction mode using the selected candidate mode list. In some instances, the selected candidate mode list can omit entries for intra prediction modes that are substantially perpendicular to the direction of the non-square partitions. For example, if the direction of the non-square partitions is vertical, then the selected candidate mode list may not include a horizontal intra prediction mode, or if the direction of the non-square partitions is horizontal, then the selected candidate list may not include a vertical intra prediction mode.

Figure 6:
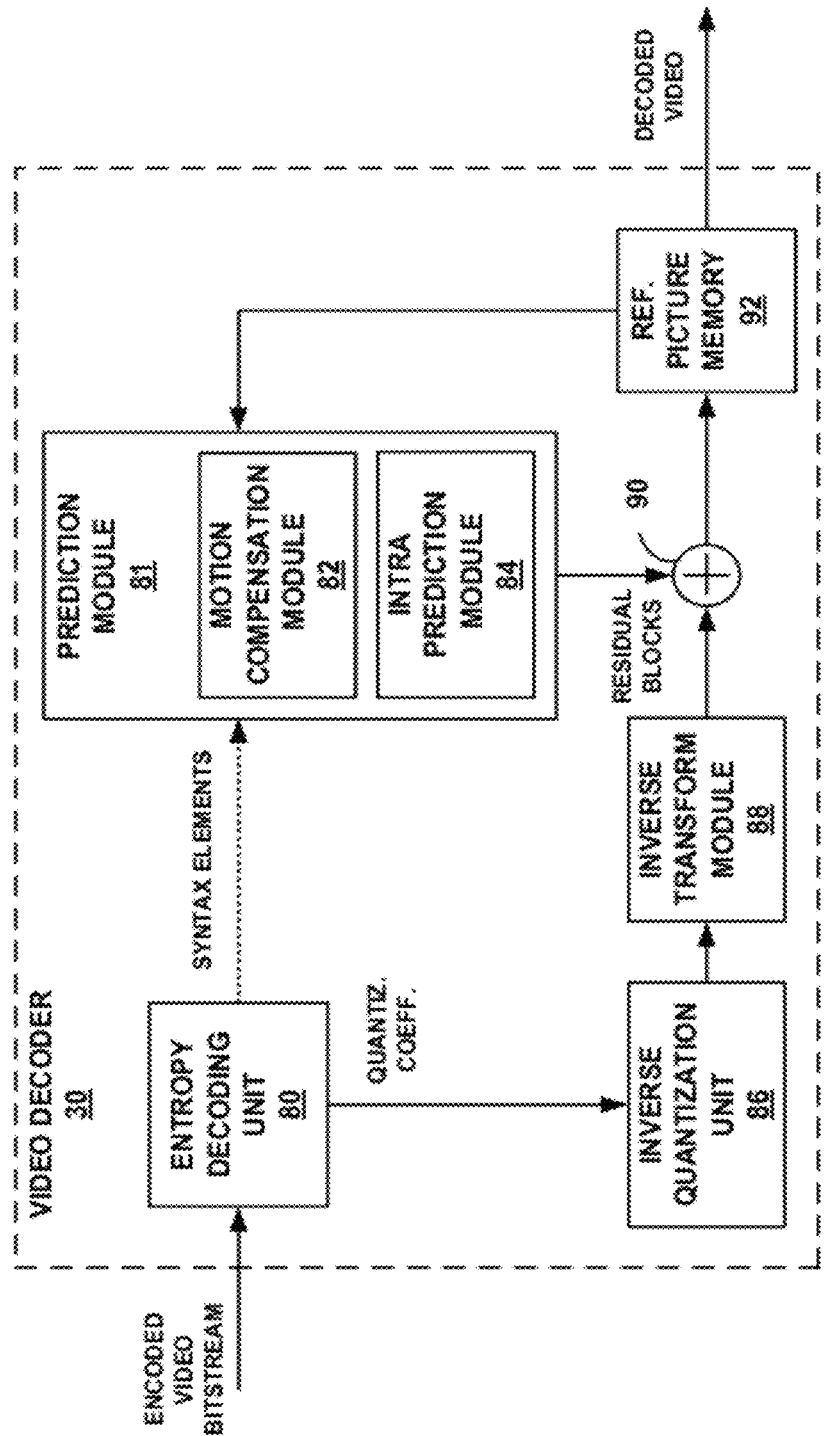
FIG. 6 is a block diagram illustrating an example video decoder that may implement the coding techniques described in this disclosure.

FIG. 6 is a block diagram illustrating an example video decoder 30 that may implement the techniques described in this disclosure. In the example of FIG. 6, video decoder 30 includes an entropy decoding unit 80, prediction module 81, inverse quantization unit 86, inverse transformation unit 88, summer 90, and reference picture memory 92. Prediction module 81 includes motion compensation unit 82 and intra prediction module 84. Video decoder 30 may, in some examples, perform a decoding pass generally reciprocal to the encoding pass described with respect to video encoder 20 from FIG. 3.

During the decoding process, video decoder 30 receives an encoded video bitstream that represents video blocks of an encoded video slice and associated syntax elements from video encoder 20. Entropy decoding unit 80 of video decoder 30 entropy decodes the bitstream to generate quantized coefficients, motion vectors, and other syntax elements. Entropy decoding unit 80 may, for example, decode CABAC coded data. Entropy decoding unit 80 forwards the decoded syntax elements to prediction module 81. Video decoder 30 may receive the syntax elements at the video slice level and/or the video block level.

When the video frame is coded as an inter-coded (i.e., B, P or GPB) slice, motion compensation unit 82 of prediction module 81 produces predictive blocks for a video block of the current video slice based on the motion vectors and other syntax elements received from entropy decoding unit 80. The predictive blocks may be produced from one of the reference pictures within one of the reference picture lists. Video decoder 30 may construct the reference frame lists, List 0 and List 1, using default construction techniques based on reference pictures stored in reference picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predictive blocks.

When the video slice is coded as an intra-coded (I) slice, intra prediction module 84 of prediction module 81 may generate prediction data for a video block of the current video slice based on a signaled intra prediction mode and data from previously decoded blocks of the current frame or picture. As explained previously with reference to FIG. 5, assuming video decoder 30 is decoding video blocks according to a raster-scan order, then block 55 and block 53 are decoded prior to block 51. Therefore, information associated with block 55 and/or block 53 may be used as part of decoding block 51.

Intra prediction module 84 can identify a most probable intra prediction mode for a block being decoded in the same manner described above for video encoder 20, meaning intra prediction module 84 may identify one or more most probable intra prediction modes based on, for example, an already decoded left-neighboring block and an already decoded above-neighboring block. Determination of the one or more most probable intra prediction modes may also, for example, be based at least in part on a direction of SDIP partitions for the block being decoded. Again referring back to FIG. 5 as an example, if block 51 is partitioned into vertical SDIP PUs, then intra prediction module 84 may identify the intra prediction mode for block 53 as the most probable intra prediction mode for block 51. As another example, if block 51 is partitioned into horizontal SDIP PUs, then intra prediction module 84 may identify the intra prediction mode for block 55 as the most probable intra prediction mode for block 51.

In examples where intra prediction module 84 identifies three most probable modes, intra prediction module 84 may use the direction of the SDIP partitions for block 51 to determine which of blocks 53 and 55 are used to determine the first most probable mode. In examples where blocks 53 and 55 are coded using the same intra prediction mode, then intra prediction module 84 may select the first most probable mode as the intra prediction mode of blocks 53 and 55 and select the second and third most probable modes based on some other criteria. The other criteria may, for example, involve choosing intra predictions modes with prediction angles close to the angle of the intra mode of blocks 53 and 55, may involve always selecting the same mode (e.g. always DC or always planar), or may involve some other criteria.

In examples, where blocks 53 and 55 are coded using different intra prediction modes, intra prediction module 84 may select each of the different intra prediction modes as a most probable mode. According to the techniques of this disclosure, which of the two intra prediction module 84 selects as the first most probable intra prediction mode may be based on a direction of the SDIP partitions of block 51. For example, if block 51 is partitioned into vertical SDIP PUs, then intra prediction module 84 may select the intra prediction mode of block 53 as the first most probable mode, the intra prediction mode of block 55 as the second most probable mode, and use some other criteria to select the third most probable mode. If block 51 is partitioned into horizontal SDIP PUs, then intra prediction module 84 may select the intra prediction mode of block 55 as the first most probable mode, the intra prediction mode of block 53 as the second most probable mode, and use some other criteria to select the third most probable mode. In general, video decoder 30 may implement the same techniques for determining most probable intra prediction modes as implemented by video encoder 20 in order to minimize the amount of syntax that has to be signaled in the encoded bitstream.

If using one most probable mode, intra prediction module 84 can parse a first bit or series of bits to determine if the actual intra prediction mode for the block being decoded is the most probable intra prediction mode. If the actual mode is not the most probable intra prediction mode, then intra prediction module 84 can determine the actual intra prediction mode based on additional syntax, such as a received codeword that maps to a mode index using a candidate mode list.

If using more than one most probable mode, intra prediction module 84 can parse a first bit or series of bits to determine if the actual intra prediction mode is one of the most probable modes. If the actual intra prediction mode is one of the most probable modes, then intra prediction module 84 can parse additional bits to determine which of the most probable modes corresponds to the actual mode. If the actual intra prediction mode is not one of the most probable modes, then intra prediction module 84 may receive additional syntax, such as a codeword that maps to a mode index using a candidate mode list.

Video decoder 30 may generate or maintain the same candidate mode lists generated or maintained by video encoder 20. Video decoder 30 may also select a candidate mode list from one or more candidate lists in the same manner as video encoder 20. For example, video decoder 30 may select a candidate mode list based on a coding context. As one example of such a context, for CUs coded using SDIP partitions, the selection of a candidate mode list may be based on a direction of SDIP partitions. For example, if a CU has vertical SDIP partitions, video decoder 30 may select a candidate mode list where intra prediction modes perpendicular or substantially perpendicular to the SDIP partitions are mapped to longer codewords, indicating that those intra prediction modes are typically less probable than other intra prediction modes.

Additionally, when video decoder 30 is decoding a CU using an SDIP mode, video decoder 20 may select an actual prediction mode using a candidate mode list that includes fewer intra prediction modes than the number of intra prediction modes shown above in Table 2. In particular, video decoder 20 may select an actual prediction mode using a candidate mode list that omits entries for intra prediction modes that are substantially perpendicular to the direction of the SDIP partitions. For example, referring to FIG. 4, for a CU being predicted using horizontal SDIP partitions, video decoder 30 may select an actual intra prediction mode using a candidate mode list that omits an entry for vertical prediction mode 1 or entries for substantially vertical prediction modes 12, 22, 23, and 13. Similarly, for a CU being predicted using vertical SDIP partitions, video decoder 30 may select an actual intra prediction mode from a candidate mode list that omits an entry for horizontal prediction mode 2 or entries for substantially horizontal intra prediction modes 16, 30, 31, and 17. In various implementations, more or fewer substantially perpendicular prediction modes may be omitted from a candidate mode list.

Inverse quantization unit 86 inverse quantizes, i.e., de-quantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied. Inverse transform module 88 applies an inverse transform, e.g., an inverse DCT, an inverse integer transform, or a conceptually similar inverse transform process, to the transform coefficients in order to produce residual blocks in the pixel domain.

After prediction module 81 generates the predictive block for the current video block based on either intra prediction or motion compensation, video decoder 30 forms a decoded video block by summing the residual blocks from inverse transform module 88 with the corresponding predictive blocks generated by prediction module 81. Summer 90 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 92, which stores reference pictures used for subsequent motion compensation. Reference picture memory 92 also stores decoded video for later presentation on a display device, such as display device 32 of FIG. 1.

In this manner, video decoder 30 of FIG. 4 represents an example of a video decoder configured to receive a block of video data; determine the block of video data is partitioned using non-square partitions; determine a most probable intra prediction mode for the block based at least in part on a direction of the non-square partitions; decode data representative of an actual intra prediction mode for the block based at least in part on the determined most probable intra prediction mode; and calculate prediction data for the non-square partitions using the actual intra prediction mode. As part of determining the most probable intra prediction mode, video decoder 30 can be configured to select an intra prediction mode of a left-neighboring block as the most probable intra prediction mode when the direction of the non-square partitions is vertical and select an intra prediction mode of an above-neighboring block as the most probable intra prediction mode when the direction of the non-square partitions is horizontal. When the intra prediction mode of a left-neighboring block is different than the intra prediction mode of an above-neighboring block and when the direction of the non-square partitions is vertical, video decoder 30 may select the intra prediction mode of the left-neighboring block as the most probable intra prediction mode. When the intra prediction mode of a left-neighboring block is different than the intra prediction mode of an above-neighboring block and when the direction of the non-square partitions is horizontal, video decoder 30 may select the intra prediction mode of the above-neighboring block as the most probable intra prediction mode.

As part of decoding the data representative of the actual intra prediction mode, video decoder 30 can be configured to determine a value for a flag. The value of the flag can be indicative of whether the actual intra prediction mode is the same as the most probable intra prediction mode. As part of decoding the data representative of the actual prediction mode, video decoder 30 can be configured to select a candidate mode list based on the direction of the non-square partitions and code the data representative of the actual prediction mode using the selected candidate mode list. In some instances, the selected candidate mode list may omit entries for intra prediction modes that are substantially perpendicular to the direction of the non-square partitions. For example, if the direction of the non-square partitions is vertical, then the selected candidate list may not include a horizontal intra prediction mode, or if the direction of the non-square partitions is horizontal, then the selected candidate list may not include a vertical intra prediction mode.

In some examples, the generating and parsing of luma intra prediction mode (intra_pred_mode) syntax may include two cases depending on the value of "intra_pred_mode" for neighboring blocks (e.g. blocks 55 and 53 in FIG. 5). As will be explained in greater detail below, the two cases may involve the use of one most probable mode or two most probable modes. Video decoder 30 represents an example of a video decoder configured to parse such syntax, and video encoder 20 represents an example of a video encoder configured to generate such syntax. In such an example, values for candidate mode list (candModeList) and number of candidate modes (NumMPMC) may be derived from the intra_pred_mode of the neighboring blocks (candIntraPredModeA and candIntraPredModeB) as follows:

If both candIntraPredModeN (i.e. both candIntraPredModeA and candIntraPredModeB) are not available, then a value (e.g. value 2 or value 1 corresponding to DC mode) may be assigned to candModeList[0] and NumMPMC and is set equal to 1, meaning one most probable mode is used.

Otherwise, if only one candIntraPredModeN is available or if both candIntraPredModeN are the same, then this candIntraPredModeN is assigned to candModeList[0] and NumMPMCand is set equal to 1, meaning one most probable mode is used.

Otherwise, both candIntraPredModeN are assigned to the candidate modes list with the smaller of the two candidates at candModeList[0] and the larger at candModeList[1] and NumMPMC and is set equal to 2, meaning two most probable modes are used.

IntraPredMode[xB][yB] (i.e. the intra prediction mode of a block identified by coordinates xB and yB) may be derived by applying the following procedure.

If prev_intra_pred_flag[xB][yB] is true, the IntraPredMode[xB][yB] is set equal to candModeList[mpm_idx[xB][yB]], where prev_intra_pred_flag[xB][yB] corresponds to a flag indicating if the actual prediction mode is the most probable mode.

Otherwise IntraPredMode[xB][yB] is derived by applying the following procedure

IntraPredMode[xB][yB]=rem_intra_luma_pred_mode, where rem_intra_luma_pred_mode corresponds to additional syntax that includes an index (cIdx) of the actual intra prediction modes.

for (cIdx=0; cIdx<NumMPMCand; cIdx++)
  if (IntraPredMode[xB][yB]>=candModeList[cIdx])
IntraPredMode[xB][yB]++

According to the techniques of this disclosure, video decoder 30 may select a preferred candidate mode for use as a most probable intra prediction mode based on a partition direction for a CU being coded. For example, when candIntraPredModeA and candIntraPredModeB are different, unlike the regular block, there may exist some higher priorities to either candIntraPredModeA or candIntraPredModeB based on different partition direction. For example, if the partition direction is hN×2N or 1×N, the intra prediction mode of the current block may be more likely to be candIntraPredModeA than candIntraPredModeB. If the partition direction is 2N×hN or N×1, the intra prediction mode of the current block may be more likely to be candIntraPredModeB than candIntraPredModeA.

Accordingly, video decoder 30 may be configured to determine a most probable intra prediction mode based on the following criteria.

If both candIntraPredModeN are not available, then a value (e.g. 2, 1, or any other mode index) is assigned to candModeList[0] and NumMPMC and is set equal to 1

Otherwise, if only one candIntraPredModeN is available or if both candIntraPredModeN are the same, then this candIntraPredModeN is assigned to candModeList[0] and NumMPMCand is set equal to 1

Otherwise, if SdipFlag is equal to the value false, meaning the current block is not coded using SDIP partitions, then both candIntraPredModeN are assigned to the candidate modes list with the smaller of the two candidates at candModeList[0] and the larger at candModeList[1] and NumMPMC and is set equal to 2.

Otherwise, if SdipFlag is equal to the value true, meaning the current block is coded using SDIP partitions, and the partition direction is hN×2N or 1×N, then candIntraPredModeA is assigned to candModeList[0] and candIntraPredModeB is assigned to candModeList[1] and NumMPMC and is set equal to 2.

Otherwise, candIntraPredModeB is assigned to candModeList[0] and candIntraPredModeA is assigned to candModeList[1] and NumMPMC and is set equal to 2.

Additionally, video decoder 30 may select a candidate mode list (rem_intra_luma_pred_mode) based on partition direction. In this manner, the syntax element "rem_intra_luma_pred_mode" may have some dependency on the partition direction and may be coded separately when the partition direction is different. For example, video decoder 30 can use different sets of contexts for the partition direction being hN×2N/1×N or 2N×hN or N×1, where h represents half (i.e. hN equals half of N). For example, video decoder 30 can use different lookup tables for the partition direction being hN×2N/1×N or 2N×hN or N×1 to generate codewords for a binarization process.

Video decoder 30 may also, as described above, select a subset of intra prediction modes based on the partition direction of the block. For example, when the partition shape is hN×2N/1×N, the vertical prediction modes may be more popular than the horizontal prediction modes. Then a subset of intra prediction mode can be formed by including the top N most probable intra prediction modes. With the decreasing of the number of intra prediction modes for the partition, the total overhead needed to represent each mode may be reduced. It may also reduce the encoder complexity by pruning out some prediction modes during mode decision.

Figure 7:
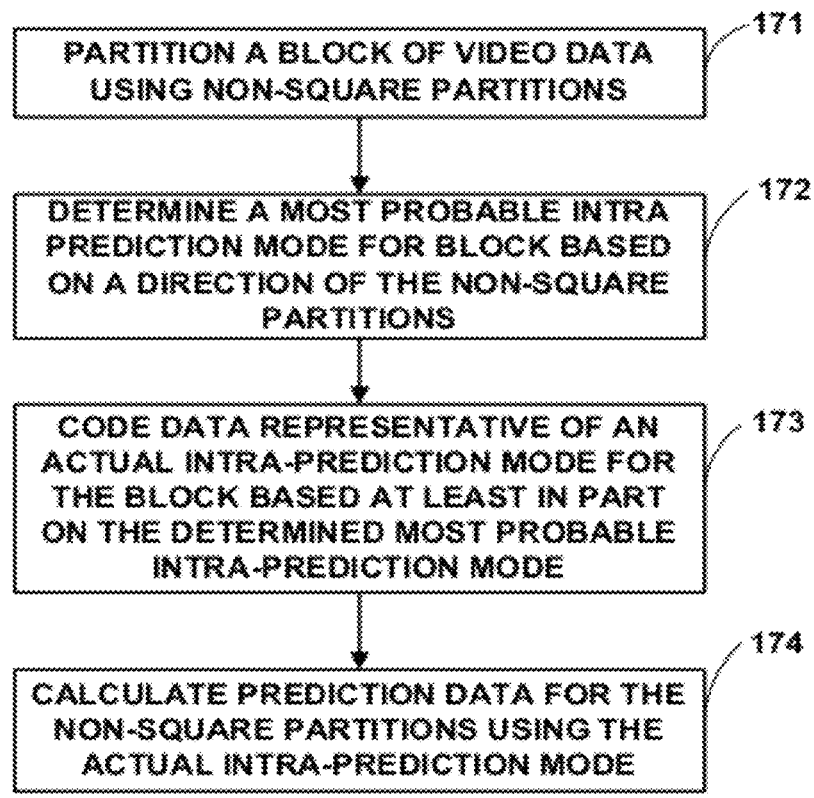
FIG. 7 is a flowchart illustrating an example method for encoding video data using the coding techniques described in this disclosure.

FIG. 7 is a flowchart illustrating an example method of encoding video data according to the techniques of this disclosure. For purposes of example, the method of FIG. 7 is described with respect to video encoder 20 of FIGS. 1 and 3 although the method may also be implemented by other types of video encoders.

Video encoder 20 may partition a block of video data using non-square partitions (171). Video encoder 20 may, for example, partition a video block using one or more non-square partitions corresponding to the shapes and sizes of SDIP partitions discussed above in relation to FIGS. 2A and 2B.

Video encoder 20 may determine a most probable intra prediction mode for the block based at least in part on a direction of the non-square partitions (172). Determining a most probable intra prediction mode may, for example, include selecting an intra prediction mode of a left-neighboring block as the most probable intra prediction mode when the direction of the non-square partitions is vertical, and selecting an intra prediction mode of an above-neighboring block as the most probable intra prediction mode when the direction of the non-square partitions is horizontal. Determining the most probable intra prediction mode may also, for example, include selecting the intra prediction mode of the left-neighboring block as the most probable intra prediction mode when the intra prediction mode of a left-neighboring block is different than the intra prediction mode of an above-neighboring block and when the direction of the non-square partitions is vertical, and/or selecting the intra prediction mode of the above-neighboring block as the most probable intra prediction mode when the intra prediction mode of a left-neighboring block is different than the intra prediction mode of an above-neighboring block and when the direction of the non-square partitions is horizontal.

Video encoder 20 may code data representative of an actual intra prediction mode for the block based at least in part on the determined most probable intra prediction mode (173). Coding the data representative of the actual intra prediction mode may, for example include determining a value for a flag that is indicative of whether the actual intra prediction mode is the same as the most probable intra prediction mode. Coding the data representative of the actual intra prediction mode may also, for example, include selecting a candidate mode list based on the direction of the non-square partitions and coding the data representative of the actual prediction mode using the selected candidate mode list. The selected candidate mode list may omit entries for intra prediction modes that are substantially perpendicular to the direction of the non-square partitions. For example, if the direction of the SDIP partitions is vertical, then the selected candidate list may omit a horizontal intra prediction mode, and if the direction of the non-square partitions is horizontal, then the selected candidate list may omit a vertical intra prediction mode. The selected candidate mode list may, for example, be a codeword table that can be used to binarize an indication of the actual intra prediction mode, and the binarized indication can be CABAC coded.

Video encoder 20 may calculate prediction data for the non-square partitions using the actual intra prediction mode (174). As explained above, the prediction data may be used to calculate residual data, which is transformed, quantized, and entropy coded.

Figure 8:
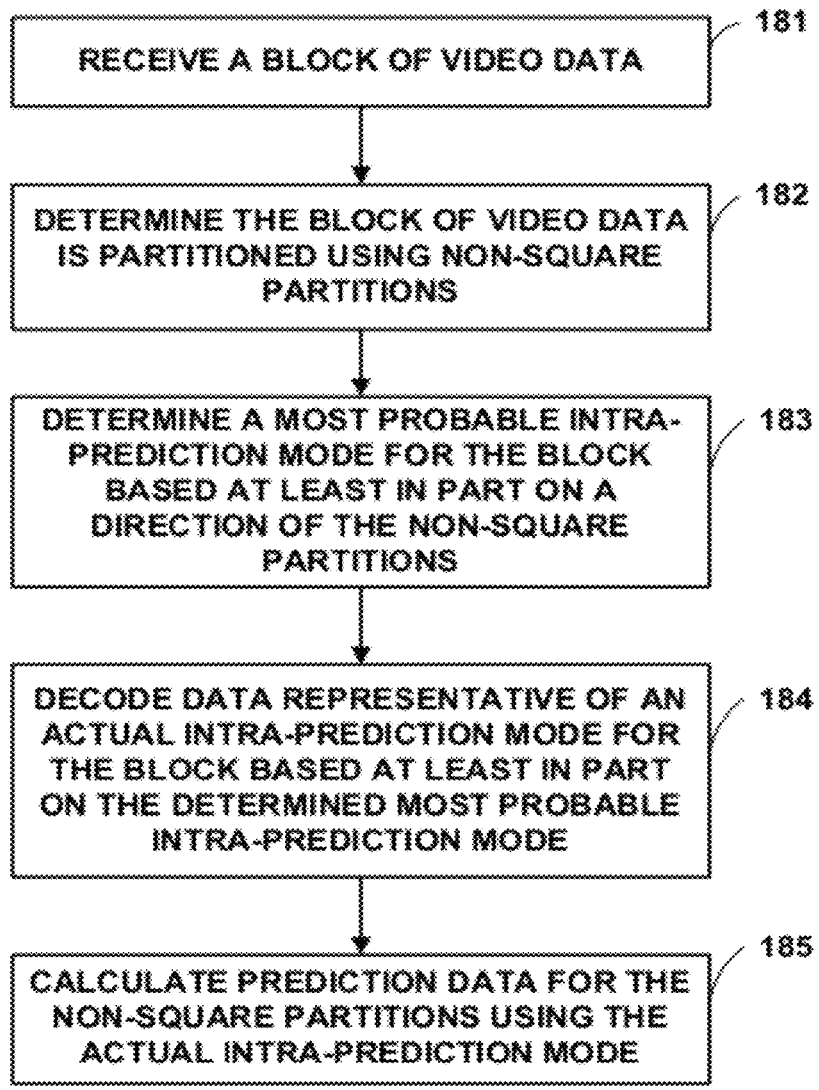
FIG. 8 is a flowchart illustrating another example method for decoding video data using the coding techniques described in this disclosure.

FIG. 8 is a flowchart illustrating an example method of decoding video data according to the techniques of this disclosure. For purposes of example, the method of FIG. 8 is described with respect to video decoder 30 of FIGS. 1 and 6 although the method may also be implemented by other types of video decoders.

Video decoder 30 may receive a block of video data (181) and determine the block of video data is partitioned using non-square partitions (182). Video decoder 30 may determine a most probable intra prediction mode for the block based at least in part on a direction of the non-square partitions (183).

To determine the most probable intra prediction mode, video encoder 30 may, for example selecting an intra prediction mode of a left-neighboring block as the most probable intra prediction mode when the direction of the non-square partitions is vertical and select an intra prediction mode of an above-neighboring block as the most probable intra prediction mode when the direction of the non-square partitions is horizontal. To determine the most probable intra prediction mode, video encoder 30 may also select the intra prediction mode of the left-neighboring block as the most probable intra prediction mode when the intra prediction mode of a left-neighboring block is different than the intra prediction mode of an above-neighboring block and when the direction of the non-square partitions is vertical and/or select the intra prediction mode of the above-neighboring block as the most probable intra prediction mode when the intra prediction mode of a left-neighboring block is different than the intra prediction mode of an above-neighboring block and when the direction of the non-square partitions is horizontal.

Video decoder 30 may decode data representative of an actual intra prediction mode for the block based at least in part on the determined most probable intra prediction mode (184). To decode the data representative of the actual intra prediction mode, video decoder 30 may determine a value for a flag is indicative of whether the actual intra prediction mode is the same as the most probable intra prediction mode. Video decoder 30 may also select a candidate mode list based on the direction of the non-square partitions and code the data representative of the actual prediction mode using the selected candidate mode list. The selected candidate mode list may omit entries for intra prediction modes that are substantially perpendicular to the direction of the non-square partitions. For example, if the direction of the non-square partitions is vertical, the selected candidate list may not include a horizontal intra prediction mode, and if the direction of the non-square partitions is horizontal, then the selected candidate list may not include a vertical intra prediction mode.

Video encoder 30 may calculate prediction data for the non-square partitions using the actual intra prediction mode (185).

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of encoding video data, the method comprising:
    partitioning a block of video data into a plurality of partitions, wherein the plurality of partitions comprise a rectangular, non-square partition, wherein the rectangular, non-square partition comprises an N×M partition, wherein N and M are integer numbers of pixels;
    determining a most probable intra prediction mode for the rectangular, non-square partition based at least in part on a partition direction of the rectangular, non-square partition, wherein the partition direction comprises one of a horizontal direction where N is greater than M or a vertical direction where N is less than M; and
    encoding data representative of an actual intra prediction mode for the rectangular, non-square partition based at least in part on the determined most probable intra prediction mode, wherein encoding the data representative of the actual intra prediction mode comprises encoding a value for a flag, wherein the value of the flag is indicative of whether the actual intra prediction mode is the same as the most probable intra prediction mode.

2. The method of claim 1, wherein determining the most probable intra prediction mode comprises:
    when the partition direction of the rectangular, non-square partition is the vertical direction, selecting an intra prediction mode of a left-neighboring block as the most probable intra prediction mode; and
    when the partition direction of the rectangular, non-square partition is the horizontal direction, selecting an intra prediction mode of an above-neighboring block as the most probable intra prediction mode.

3. The method of claim 1, wherein determining the most probable intra prediction mode comprises:
    when the intra prediction mode of a left-neighboring block is different than the intra prediction mode of an above-neighboring block and when the partition direction of the rectangular, non-square partition is the vertical direction, selecting the intra prediction mode of the left-neighboring block as the most probable intra prediction mode.

4. The method of claim 1, wherein determining the most probable intra prediction mode comprises:
    when the intra prediction mode of a left-neighboring block is different than the intra prediction mode of an above-neighboring block and when the partition direction of the rectangular, non-square partition is the horizontal direction, selecting the intra prediction mode of the above-neighboring block as the most probable intra prediction mode.

5. The method of claim 1, wherein encoding the data representative of the actual prediction mode further comprises:
    selecting a codeword table based on the partition direction of the rectangular, non-square partition; and
    encoding the data representative of the actual prediction mode using the selected codeword table.

6. The method of claim 5, wherein the selected codeword table omits entries for intra prediction modes that are substantially perpendicular to the partition direction of the rectangular, non-square partition.

7. The method of claim 5, wherein the partition direction of the rectangular, non-square partition is the vertical direction and the selected codeword table omits a horizontal intra prediction mode.

8. The method of claim 5, wherein the partition direction of the rectangular, non-square partition is the horizontal direction and the selected codeword table omits a vertical intra prediction mode.

9. The method of claim 1, wherein partitioning the block of video data into the plurality of partitions comprises partitioning the block using short distance intra prediction (SDIP) mode partitions.

10. The method of claim 1, wherein the rectangular, non-square partition comprise one of a 2N×N or a N×2N partition.

11. The method of claim 1, wherein the rectangular, non-square partition comprise an asymmetric partition.

12. The method of claim 1, further comprising:
    calculating prediction data for the rectangular, non-square partition using the actual intra prediction mode.

13. The method of claim 1, wherein encoding data representative of the actual intra prediction mode for the rectangular, non-square partition based at least in part on the determined most probable intra prediction mode comprises binarizing an indication of the actual intra prediction and applying context adaptive binary arithmetic coding (CABAC) to the binarized indication.

14. The method of claim 1, wherein determining the most probable intra prediction mode for the rectangular, non-square partition based at least in part on the partition direction of the rectangular, non-square partitions comprises determining the most probable intra prediction mode based at least in part on whether the rectangular, non-square partition comprise a horizontal partition or whether the rectangular non-square partition comprise a vertical partition.

15. An apparatus for encoding video data, the apparatus comprising:
    a memory for storing video data; and
    a video encoder comprising one or more processors configured to partition a block of the video data into a plurality of partitions, wherein the plurality of partitions comprise a rectangular, non-square partition, wherein the rectangular, non-square partition comprises an N×M partition, wherein N and M are integer numbers of pixels; determine a most probable intra prediction mode for the rectangular, non-square partition based at least in part on a partition direction of the rectangular, non-square partition, wherein the partition direction comprises one of a horizontal direction where N is greater than M or a vertical direction where N is less than M; and encode data representative of an actual intra prediction mode for the rectangular, non-square partition based at least in part on the determined most probable intra prediction mode, wherein to encode the data representative of the actual intra prediction mode, the one or more processors encode a value for a flag, wherein the value of the flag is indicative of whether the actual intra prediction mode is the same as the most probable intra prediction mode.

16. The apparatus of claim 15, wherein to determine the most probable intra prediction mode, the one or more processors are further configured to:
   when the partition direction of the rectangular, non-square partition is the vertical direction, select an intra prediction mode of a left-neighboring block as the most probable intra prediction mode; and
   when the partition direction of the rectangular, non-square partition is the horizontal direction, select an intra prediction mode of an above-neighboring block as the most probable intra prediction mode.

17. The apparatus of claim 15, wherein to determine the most probable intra prediction mode, the one or more processors are further configured to:
   when the intra prediction mode of a left-neighboring block is different than the intra prediction mode of an above-neighboring block and when the partition direction of the rectangular, non-square partition is the vertical direction, select the intra prediction mode of the left-neighboring block as the most probable intra prediction mode.

18. The apparatus of claim 15, wherein to determine the most probable intra prediction mode, the one or more processors are further configured to:
   when the intra prediction mode of a left-neighboring block is different than the intra prediction mode of an above-neighboring block and when the partition direction of the rectangular, non-square partition is the horizontal direction, select the intra prediction mode of the above-neighboring block as the most probable intra prediction mode.

19. The apparatus of claim 15, wherein to encode the data representative of the actual prediction mode, the one or more processors are further configured to:
   select a codeword table based on the partition direction of the rectangular, non-square partition; and
   encode the data representative of the actual prediction mode using the selected codeword table.

20. The apparatus of claim 19, wherein the selected codeword table omits entries for intra prediction modes that are substantially perpendicular to the partition direction of the rectangular, non-square partition.

21. The apparatus of claim 19, wherein the partition direction of the rectangular, non-square partition is the vertical direction and the selected codeword table omits a horizontal intra prediction mode.

22. The apparatus of claim 19, wherein the partition direction of the rectangular, non-square partition is the horizontal direction and the selected codeword table omits a vertical intra prediction mode.

23. The apparatus of claim 15, wherein the one or more processors are configured to partition the block of video data using short distance intra prediction (SDIP) mode partitions.

24. The apparatus of claim 15, wherein the rectangular, non-square partition comprise one of a 2N×N or a N×2N partition.

25. The apparatus of claim 15, wherein the rectangular, non-square partition comprise an asymmetric partition.

26. The apparatus of claim 15, wherein the one or more processors are further configured to calculate prediction data for the rectangular, non-square partition using the actual intra prediction mode.

27. The apparatus of claim 15, wherein the one or more processors are further configured to binarize an indication of the actual intra prediction and apply context adaptive binary arithmetic coding (CABAC) to the binarized indication.

28. The apparatus of claim 15, wherein the apparatus comprises at least one of:
   an integrated circuit;
   a microprocessor; or
   a wireless communication device that includes the video encoder and further includes a camera configured to generate the video data.

29. The apparatus of claim 15, wherein the video encoder determines the most probable intra prediction mode based at least in part on whether the rectangular, non-square partition comprises a horizontal partition or whether the rectangular non-square partition comprises a vertical partition.

30. A method of decoding video data, the method comprising:
   receiving a block of video data;
   determining the block of video data is partitioned using rectangular, non-square partitions, wherein the rectangular, non-square partition comprises an N×M partition, wherein N and M are integer numbers of pixels;
   determining a most probable intra prediction mode for a rectangular, non-square partition of the block based at least in part on a partition direction of the rectangular, non-square partition, wherein the partition direction comprises one of a horizontal direction where N is greater than M or a vertical direction where N is less than M; and
   decoding data representative of an actual intra prediction mode for the rectangular, non-square partition based at least in part on the determined most probable intra prediction mode, wherein decoding the data representative of the actual intra prediction mode comprises decoding a value for a flag, wherein the value of the flag is indicative of whether the actual intra prediction mode is the same as the most probable intra prediction mode.

31. The method of claim 30, wherein determining the most probable intra prediction mode comprises:
   when the partition direction of the rectangular, non-square partition is the vertical direction, selecting an intra prediction mode of a left-neighboring block as the most probable intra prediction mode; and
   when the partition direction of the rectangular, non-square partition is the horizontal direction, selecting an intra prediction mode of an above-neighboring block as the most probable intra prediction mode.

32. The method of claim 30, wherein determining the most probable intra prediction mode comprises:
   when the intra prediction mode of a left-neighboring block is different than the intra prediction mode of an above-neighboring block and when the partition direction of the rectangular, non-square partition is the vertical direction, selecting the intra prediction mode of the left-neighboring block as the most probable intra prediction mode.

33. The method of claim 30, wherein determining the most probable intra prediction mode comprises:
   when the intra prediction mode of a left-neighboring block is different than the intra prediction mode of an above-neighboring block and when the partition direction of the rectangular, non-square partition is the horizontal direction, selecting the intra prediction mode of the above-neighboring block as the most probable intra prediction mode.

34. The method of claim 30, wherein decoding the data representative of the actual prediction mode comprises:
   selecting a codeword table based on the partition direction of the rectangular, non-square partition; and
   decoding the data representative of the actual prediction mode using the selected codeword table.

35. The method of claim 34, wherein the selected codeword table omits entries for intra prediction modes that are substantially perpendicular to the partition direction of the rectangular, non-square partition.

36. The method of claim 34, wherein the partition direction of the rectangular, non-square partition is the vertical direction and the selected codeword table omits a horizontal intra prediction mode.

37. The method of claim 34, wherein the partition direction of the rectangular, non-square partition is the horizontal direction and the selected codeword table omits a vertical intra prediction mode.

38. The method of claim 30, wherein determining the block of video data is partitioned using rectangular, non-square partitions comprises determining the block of video data is partitioned using short distance intra prediction (SDIP) mode partitions.

39. The method of claim 30, wherein the rectangular, non-square partition comprise one of a 2N×N or a N×2N partition.

40. The method of claim 30, wherein the rectangular, non-square partition comprise an asymmetric partition.

41. The method of claim 30, further comprising:
   applying context adaptive binary arithmetic coding (CABAC) to the data to determine a binarized indication of the actual intra prediction mode;
   mapping the binarized indication of the actual intra prediction mode to the actual prediction mode using the selected codeword table.

42. The method of claim 30, wherein determining the most probable intra prediction mode comprises determining the most probable intra prediction mode based at least in part on whether the rectangular, non-square partition comprises a horizontal partition or whether the rectangular non-square partition comprises a vertical partition.

43. The method of claim 30, wherein the block comprises a coding unit, and wherein the rectangular, non-square partition comprises a prediction unit.

44. The method of claim 30, further comprising:
   Receiving video data comprising the block of video data at a receiver of a wireless communication device;
   storing the video data on a memory of the wireless communication device; and
   processing the video data on one or more processors of the wireless communication device.

45. The method of claim 44, wherein the wireless communication device comprises a telephone handset and wherein receiving the video data at the receiver of the wireless communication device comprises demodulating, according to a wireless communication standard, a signal comprising the video data.

46. An apparatus for coding video data, the apparatus comprising:
   a memory storing video data; and
   a video decoder comprising one or more processors configured to: receive a block of the video data; determine the block of video data is partitioned using rectangular, non-square partitions, wherein the rectangular, non-square partition comprises an N×M partition, wherein N and M are integer numbers of pixels; determine a most probable intra prediction mode for a rectangular, non-square partition of the block based at least in part on a partition direction of the rectangular, non-square partition, wherein the partition direction comprises one of a horizontal direction where N is greater than M or a vertical direction where N is less than M; decode data representative of an actual intra prediction mode for the rectangular, non-square partition based at least in part on the determined most probable intra prediction mode, wherein to decode the data representative of the actual intra prediction mode, the one or more processors decode a value for a flag, wherein the value of the flag is indicative of whether the actual intra prediction mode is the same as the most probable intra prediction mode.

47. The apparatus of claim 46, wherein to determine the most probable intra prediction mode, the one or more processors are further configured to:
   when the partition direction of the rectangular, non-square partition is the vertical direction, select an intra prediction mode of a left-neighboring block as the most probable intra prediction mode; and
   when the partition direction of the rectangular, non-square partition is the horizontal direction, select an intra prediction mode of an above-neighboring block as the most probable intra prediction mode.

48. The apparatus of claim 46, wherein to determine the most probable intra prediction mode, the one or more processors are further configured to:
   when the intra prediction mode of a left-neighboring block is different than the intra prediction mode of an above-neighboring block and when the partition direction of the rectangular, non-square partition is the vertical direction, select the intra prediction mode of the left-neighboring block as the most probable intra prediction mode.

49. The apparatus of claim 46, wherein to determine the most probable intra prediction mode, the one or more processors are further configured to:
   when the intra prediction mode of a left-neighboring block is different than the intra prediction mode of an above-neighboring block and when the partition direction of the rectangular, non-square partition is the horizontal direction, select the intra prediction mode of the above-neighboring block as the most probable intra prediction mode.

50. The apparatus of claim 46, wherein to decode the data representative of the actual prediction mode, the one or more processors are further configured to:
   select a codeword table based on the partition direction of the rectangular, non-square partition; and
   decoding the data representative of the actual prediction mode using the selected codeword table.

51. The apparatus of claim 50, wherein the selected codeword table omits entries for intra prediction modes that are substantially perpendicular to the partition direction of the rectangular, non-square partition.

52. The apparatus of claim 50, wherein the partition direction of the rectangular, non-square partition is the vertical direction and the selected codeword table omits a horizontal intra prediction mode.

53. The apparatus of claim 50, wherein the partition direction of the rectangular, non-square partition is the horizontal direction and the selected codeword table omits a vertical intra prediction mode.

54. The apparatus of claim 46, wherein the one or more processors are further configured to determine the block of video data is partitioned using rectangular, non-square partitions by determining the block of video data is partitioned using short distance intra prediction (SDIP) mode partitions.

55. The apparatus of claim 46, wherein the rectangular, non-square partition comprise one of a 2N×N or a N×2N partition.

56. The apparatus of claim 46, wherein the rectangular, non-square partition comprise an asymmetric partition.

57. The apparatus of claim 46, wherein the one or more processors are further configured to apply context adaptive binary arithmetic coding (CABAC) to the data to determine a binarized indication of the actual intra prediction mode and map the binarized indication of the actual intra prediction mode to the actual prediction mode using the selected codeword table.

58. The apparatus of claim 46, wherein the apparatus comprises at least one of:
an integrated circuit;
a microprocessor; or
a wireless communication device that includes the video decoder and further includes a display configured to display decoded video data.

59. The apparatus of claim 46, wherein the video decoder determines the most probable intra prediction mode based at least in part on whether the rectangular, non-square partition comprises a horizontal partition or whether the rectangular non-square partition comprises a vertical partition.

60. The device of claim 46, wherein the block comprises a coding unit, and wherein the rectangular, non-square partition comprises a prediction unit.

61. The apparatus of claim 46, wherein the apparatus comprises a wireless communication device, and wherein the apparatus further comprises a receiver configured to receive video data comprising the block of video data.

62. The apparatus of claim 61, wherein the wireless communication device comprises a telephone handset and wherein the receiver is configured to demodulate, according to a wireless communication standard, a signal comprising the video data.

63. An apparatus comprising:
means for partitioning a block of video data into a plurality of partitions, wherein the plurality of partitions comprise a rectangular, non-square partition, wherein the rectangular, non-square partition comprises an N×M partition, wherein N and M are integer numbers of pixels;
means for determining a most probable intra prediction mode for the rectangular, non-square partition based at least in part on a partition direction of the rectangular, non-square partition, wherein the partition direction comprises one of a horizontal direction where N is greater than M or a vertical direction where N is less than M; and
means for encoding data representative of an actual intra prediction mode for the rectangular, non-square partition based at least in part on the determined most probable intra prediction mode, wherein the means for encoding the data representative of the actual intra prediction mode comprises means for encoding a value for a flag, wherein the value of the flag is indicative of whether the actual intra prediction mode is the same as the most probable intra prediction mode.

64. The apparatus of claim 63, further comprising means for determining the most probable intra prediction mode for the block based at least in part on whether the rectangular, non-square partition comprise a horizontal partition or whether the rectangular non-square partition comprise a vertical partition.

65. A non-transitory, computer readable storage medium storing instructions that upon execution cause one or more processors to:
partition a block of video data into a plurality of partitions, wherein the plurality of partitions comprise a rectangular, non-square partition, wherein the rectangular, non-square partition comprises an N×M partition, wherein N and M are integer numbers of pixels;
determine a most probable intra prediction mode for the rectangular, non-square partition based at least in part on a partition direction of the rectangular, non-square partition, wherein the partition direction comprises one of a horizontal direction where N is greater than M or a vertical direction where N is less than M; and
encode data representative of an actual intra prediction mode for the rectangular, non-square partition based at least in part on the determined most probable intra prediction mode, wherein to encode the data representative of the actual intra prediction mode, the one or more processors encode a value for a flag, wherein the value of the flag is indicative of whether the actual intra prediction mode is the same as the most probable intra prediction mode.

66. The computer readable storage medium of claim 65, wherein the instructions cause the one or more processors to determine the most probable intra prediction mode for the non-square partition based at least in part on the partition direction of the rectangular, non-square partition by determining the most probable intra prediction mode for the non-square partition based at least in part on whether the rectangular, non-square partition comprise a horizontal partition or whether the rectangular non-square partition comprise a vertical partition.

67. An apparatus comprising:
means for receiving a block of video data;
means for determining the block of video data is partitioned using rectangular, non-square partitions, wherein the rectangular, non-square partition comprises an N×M partition, wherein N and M are integer numbers of pixels;
means for determining a most probable intra prediction mode for a rectangular, non-square partition of the block based at least in part on a partition direction of the rectangular, non-square partition, wherein the partition direction comprises one of a horizontal direction where N is greater than M or a vertical direction where N is less than M;
means for decoding data representative of an actual intra prediction mode for the rectangular, non-square partition based at least in part on the determined most probable intra prediction mode, wherein the means for decoding the data representative of the actual intra prediction mode comprises means for decoding a value for a flag, wherein the value of the flag is indicative of whether the actual intra prediction mode is the same as the most probable intra prediction mode.

68. The apparatus of claim 67, further comprising means for determining the most probable intra prediction mode for the block based at least in part on whether the rectangular, non-square partition comprise a horizontal partition or whether the rectangular non-square partition comprise a vertical partition.

69. A non-transitory, computer readable storage medium storing instruction that upon execution cause one or more processors to:
- receive a block of video data;
- determine the block of video data is partitioned using rectangular, non-square partitions, wherein the rectangular, non-square partition comprises an N×M partition, wherein N and M are integer numbers of pixels;
- determine a most probable intra prediction mode for a rectangular, non-square partition of the block based at least in part on a partition direction of the rectangular, non-square partition, wherein the partition direction comprises one of a horizontal direction where N is greater than M or a vertical direction where N is less than M;
- decode data representative of an actual intra prediction mode for the rectangular, non-square partition based at least in part on the determined most probable intra prediction mode, wherein to decode the data representative of the actual intra prediction mode, the one or more processors decode a value for a flag, wherein the value of the flag is indicative of whether the actual intra prediction mode is the same as the most probable intra prediction mode.

70. The computer readable storage medium of claim 69, wherein the instructions cause the one or more processors to determine the most probable intra prediction mode for the non-square partition based at least in part on the partition direction of the rectangular, non-square partition by determining the most probable intra prediction mode for the non-square partition based at least in part on whether the rectangular, non-square partition comprise a horizontal partition or whether the rectangular non-square partition comprise a vertical partition.

* * * * *